US010948787B2

(12) United States Patent
Murata et al.

(10) Patent No.: US 10,948,787 B2
(45) Date of Patent: Mar. 16, 2021

(54) LIQUID CRYSTAL DISPLAY DEVICE HAVING SHAPED OPENINGS

(71) Applicant: SHARP KABUSHIKI KAISHA, Sakai (JP)

(72) Inventors: Mitsuhiro Murata, Sakai (JP); Yosuke Iwata, Sakai (JP); Takuma Tomotoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 153 days.

(21) Appl. No.: 16/085,111

(22) PCT Filed: Mar. 7, 2017

(86) PCT No.: PCT/JP2017/008864
§ 371 (c)(1),
(2) Date: Sep. 14, 2018

(87) PCT Pub. No.: WO2017/159434
PCT Pub. Date: Sep. 21, 2017

(65) Prior Publication Data
US 2019/0086744 A1    Mar. 21, 2019

(30) Foreign Application Priority Data
Mar. 14, 2016    (JP) .............................. JP2016-049639

(51) Int. Cl.
*G02F 1/1343*    (2006.01)
*G02F 1/1337*    (2006.01)
(Continued)

(52) U.S. Cl.
CPC .. *G02F 1/134363* (2013.01); *G02F 1/133707* (2013.01); *G02F 1/133345* (2013.01);
(Continued)

(58) Field of Classification Search
CPC ... G02F 2001/134372; G02F 1/134363; G02F 2001/134318; G02F 1/133707;
(Continued)

(56) References Cited

U.S. PATENT DOCUMENTS 7,864,282 B2 *   1/2011   Shimura   ........... G02F 1/134363
                                                  349/141
2013/0076611 A1 * 3/2013   Kesho    ............... G02F 1/134309
                                                  345/92
(Continued)

FOREIGN PATENT DOCUMENTS

JP        2006-106101 A        4/2006
JP        2006106101 A    *   4/2006
(Continued)

*Primary Examiner* — Paisley L Wilson
(74) *Attorney, Agent, or Firm* — ScienBiziP, P.C.

(57) ABSTRACT

A liquid crystal display device of the present invention includes, in the given order: a first substrate; a liquid crystal layer containing liquid crystal molecules; and a second substrate. The first substrate includes a first electrode, a second electrode closer to the liquid crystal layer than the first electrode is, and an insulating film between the first electrode and the second electrode. The second electrode is provided with openings including a first opening and a second opening adjacent to each other. The first opening and the second opening are independent of each other and are point-symmetrical to each other. The first opening and the second opening each have a shape including: curved portions that expand an opening periphery outward at the respective ends in the longitudinal direction; and paired protruding portions that allow the opening periphery to protrude partially in the lateral direction in the middle of the longitudinal direction. The liquid crystal molecules are aligned parallel to the first substrate in a no-voltage-applied state where no voltage is applied between the first electrode and the second electrode.

11 Claims, 46 Drawing Sheets

(51) Int. Cl.
*G02F 1/137* (2006.01)
*G02F 1/1333* (2006.01)

(52) U.S. Cl.
CPC .............. *G02F 2001/13706* (2013.01); *G02F 2001/133738* (2013.01); *G02F 2001/134318* (2013.01); *G02F 2001/134372* (2013.01); *G02F 2201/122* (2013.01)

(58) Field of Classification Search
CPC .......... G02F 2001/133738; G02F 2001/13706; G02F 2201/122
See application file for complete search history.

(56) References Cited

U.S. PATENT DOCUMENTS

| | | |
|---|---|---|
| 2013/0100388 A1 | 4/2013 | Matsushima |
| 2015/0160520 A1 | 6/2015 | Matsushima |
| 2016/0161811 A1 | 6/2016 | Matsushima |
| 2017/0131600 A1 | 5/2017 | Matsushima |
| 2018/0107077 A1 | 4/2018 | Matsushima |

FOREIGN PATENT DOCUMENTS

| | | |
|---|---|---|
| JP | 2013-109309 A | 6/2013 |
| JP | 2015-114493 A | 6/2015 |

\* cited by examiner

Fig. 11

| | Example 1 | | Example 2 | | Example 3 | | Example 4 | |
|---|---|---|---|---|---|---|---|---|
| Y(μm) | 0.5 | | 1.5 | | 2.5 | | 4.5 | |
| θ1(°) | 0 | | 0 | | 0 | | 0 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph | | | | | | | | |
| Evaluation | Fair | Fair | Excellent | Excellent | Good | Fair | Fair | Fair |

| | Example 5 | | Example 6 | | Example 7 | | Example 8 | |
|---|---|---|---|---|---|---|---|---|
| Y(μm) | 0.5 | | 1.5 | | 2.5 | | 4.5 | |
| θ1(°) | 2 | | 2 | | 2 | | 2 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph |  |  | | |  | |  | |
| Evaluation | Fair | Fair | Excellent | Excellent | Excellent | Good | Fair | Fair |

| | Example 9 | | Example 10 | | Example 11 | | Example 12 | |
|---|---|---|---|---|---|---|---|---|
| Y(μm) | 0.5 | | 1.5 | | 2.5 | | 4.5 | |
| θ1(°) | 4 | | 4 | | 4 | | 4 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph |  |  |  |  | | | | |
| Evaluation | Good | Fair | Excellent | Good | Excellent | Good | Fair | Fair |

Fig. 17

| | Example 13 | | Example 14 | | Example 15 | | Example 16 | |
|---|---|---|---|---|---|---|---|---|
| Y (μm) | 0.5 | | 1.5 | | 2.5 | | 4.5 | |
| θ1(°) | 5 | | 5 | | 5 | | 5 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph | | | | | | | | |
| Evaluation | Excellent | Excellent | Excellent | Excellent | Excellent | Excellent | Fair | Fair |

| | Example 17 | | Example 18 | | Example 19 | | Example 20 | |
|---|---|---|---|---|---|---|---|---|
| Y(μm) | 0.5 | | 1.5 | | 2.5 | | 4.5 | |
| θ1(°) | 6 | | 6 | | 6 | | 6 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph |  |  |  |  | | | | |
| Evaluation | Excellent | Excellent | Excellent | Excellent | Excellent | Good | Good | Good |

Fig. 21

| | Example 21 | | Example 22 | | Example 23 | | Example 24 | |
|---|---|---|---|---|---|---|---|---|
| Y(μm) | 0.5 | | 1.5 | | 2.5 | | 4.5 | |
| θ1(°) | 7 | | 7 | | 7 | | 7 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph | | | | | | | | |
| Evaluation | Excellent | Excellent | Excellent | Excellent | Excellent | Excellent | Good | Fair |

| | Example 25 | | Example 26 | | Example 27 | | Example 28 | |
|---|---|---|---|---|---|---|---|---|
| Y(μm) | 0.5 | | 1.5 | | 2.5 | | 4.5 | |
| θ1(°) | 8 | | 8 | | 8 | | 8 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph |  |  | | |  | |  | |
| Evaluation | Excellent | Excellent | Excellent | Excellent | Excellent | Excellent | Good | Good |

Fig. 25

| | Example 29 | | Example 30 | | Example 31 | | Example 32 | |
|---|---|---|---|---|---|---|---|---|
| Y(μm) | 0.5 | | 1.5 | | 2.5 | | 4.5 | |
| $\theta 1(°)$ | 10 | | 10 | | 10 | | 10 | |
| $\theta 2(°)$ | 0 | | 0 | | 0 | | 0 | |
| Applied voltage | 5.0V | 6.0V | 5.0V | 6.0V | 5.0V | 6.0V | 5.0V | 6.0V |
| Photograph | | | | | | | | |
| Evaluation | Excellent | Excellent | Excellent | Excellent | Excellent | Excellent | Excellent | Excellent |

| | Example 33 | | Example 34 | | Example 35 | | Example 36 | |
|---|---|---|---|---|---|---|---|---|
| Y(μm) | 0.5 | | 1.5 | | 2.5 | | 4.5 | |
| θ1(°) | 14 | | 14 | | 14 | | 14 | |
| θ2(°) | 0 | | 0 | | 0 | | 0 | |
| Applied voltage | 5.0V | 6.0V | 5.0V | 6.0V | 5.0V | 6.0V | 5.0V | 6.0V |
| Photograph |  |  |  |  | | | | |
| Evaluation | Excellent | Excellent | Excellent | Excellent | Excellent | Excellent | Excellent | Excellent |

Fig. 29

| | Example 37 | | Example 38 | | Example 39 | | Example 40 | |
|---|---|---|---|---|---|---|---|---|
| Y (μm) | 0.5 | | 1.5 | | 2.5 | | 4.5 | |
| θ1 (°) | 20 | | 20 | | 20 | | 20 | |
| θ2 (°) | 0 | | 0 | | 0 | | 0 | |
| Applied voltage | 5.0V | 6.0V | 5.0V | 6.0V | 5.0V | 6.0V | 5.0V | 6.0V |
| Photograph | | | | | | | | |
| Evaluation | Fair | Excellent | Fair | Good | Fair | Fair | Good | Good |

Fig. 30

| | Example 41 | | Example 42 | | Example 43 | |
|---|---|---|---|---|---|---|
| Y(μm) | 2.5 | | 2.5 | | 2.5 | |
| θ1(°) | 0 | | 2 | | 4 | |
| θ2(°) | 0 | | 2 | | 4 | |
| Applied voltage | 5.0V | 6.0V | 5.0V | 6.0V | 5.0V | 6.0V |
| Photograph | | | | | | |
| Evaluation | Good | Fair | Excellent | Excellent | Excellent | Excellent |

| | Example 44 | | Example 45 | | Example 46 | |
|---|---|---|---|---|---|---|
| Y(μm) | 2.5 | | 2.5 | | 2.5 | |
| θ1(°) | 5 | | 6 | | 7 | |
| θ2(°) | 5 | | 6 | | 7 | |
| Applied voltage | 5.0V | 6.0V | 5.0V | 6.0V | 5.0V | 6.0V |
| Photograph |  |  | | | |  |
| Evaluation | Excellent | Excellent | Excellent | Excellent | Excellent | Excellent |

| | Example 47 | | Example 48 | | Example 49 | | Example 50 | |
|---|---|---|---|---|---|---|---|---|
| Y(μm) | 2.5 | | 2.5 | | 2.5 | | 2.5 | |
| θ1(°) | 8 | | 10 | | 14 | | 20 | |
| θ2(°) | 8 | | 10 | | 14 | | 20 | |
| Applied voltage | 5.0V | 6.0V | 5.0V | 6.0V | 5.0V | 6.0V | 5.0V | 6.0V |
| Photograph |  |  |  |  | | | | |
| Evaluation | Excellent | Excellent | Fair | Excellent | Fair | Fair | Fair | Fair |

LIQUID CRYSTAL DISPLAY DEVICE HAVING SHAPED OPENINGS

TECHNICAL FIELD

The present invention relates to liquid crystal display devices. The present invention more specifically relates to a liquid crystal display device suitable as a horizontal alignment-mode liquid crystal display device provided with high-definition pixels.

BACKGROUND ART

Liquid crystal display devices are display devices that utilize a liquid crystal composition for display. A typical display mode thereof is applying voltage to a liquid crystal composition sealed between paired substrates to change the alignment state of liquid crystal molecules in the liquid crystal composition according to the applied voltage, thereby controlling the amount of light transmitted. These liquid crystal display devices, having characteristics such as thin profile, light weight, and low power consumption, have been used in a broad range of fields.

The display modes of liquid crystal display devices include horizontal alignment modes, which control the alignment of liquid crystal molecules by mainly rotating them in a plane parallel to the substrate surfaces. The horizontal alignment modes have received attention because these modes make it easy to achieve wide viewing angle characteristics. For example, the in-plane switching (IPS) mode and the fringe field switching (FFS) mode, both a type of horizontal alignment mode, are widely used in recent liquid crystal display devices for smartphones or tablet PCs.

There is continuing research and development of the horizontal alignment modes to achieve higher definition pixels, an improved transmittance, and an improved response speed to improve the display quality. With respect to techniques for improving the response speed, for example, Patent Literature 1 discloses a technique of providing a comb-teeth portion of a specific shape for a first electrode of a liquid crystal display device utilizing a fringe electric field.

CITATION LIST

Patent Literature

Patent Literature 1: JP 2015-114493 A

SUMMARY OF INVENTION

Technical Problem

The horizontal alignment modes offer the advantage of wide viewing angles, but have the problem of slow response as compared to vertical alignment modes such as the multi-domain vertical alignment (MVA) mode. Patent Literature 1 discloses that the response speed can be improved by providing a comb-teeth portion of a specific shape for a first electrode. Nevertheless, the shape of the electrode is greatly limited for ultra-high-definition pixels of 800 ppi or more, for example, and thus a complicated electrode shape as disclosed in Patent Literature 1 is difficult to form.

As mentioned above, there is a demand for a technique capable of improving the response speed in horizontal alignment-mode liquid crystal display devices with high-definition pixels.

The present invention has been made in view of the above current state of the art, and aims to provide a horizontal alignment-mode liquid crystal display device that achieves both higher definition and an improved response speed.

Solution to Problem

The present inventors performed various studies on horizontal alignment-mode liquid crystal display devices enabling high definition and rapid response, and focused on the shape of an opening of an electrode used for formation of a fringe electric field. The inventors then found that the alignment of liquid crystal molecules can be controlled without a complicated opening shape by providing a first opening and a second opening which are independent of each other and point-symmetrical to each other, the first opening and the second opening each having a shape including: curved portions that expand an opening periphery outward at the respective ends in the longitudinal direction; and paired protruding portions that allow the opening periphery to protrude partially in the lateral direction in the middle of the longitudinal direction. This configuration enables higher definition and an improved response speed, and thus the present inventors have arrived at the solution of the above problems, completing the present invention.

Specifically, one aspect of the present invention may be a liquid crystal display device including, in the given order: a first substrate; a liquid crystal layer containing liquid crystal molecules; and a second substrate, the first substrate including a first electrode, a second electrode closer to the liquid crystal layer than the first electrode is, and an insulating film between the first electrode and the second electrode, the second electrode being provided with openings including a first opening and a second opening adjacent to each other, the first opening and the second opening being independent of each other and point-symmetrical to each other, the first opening and the second opening each having a shape including: curved portions that expand an opening periphery outward at the respective ends in the longitudinal direction; and paired protruding portions that allow the opening periphery to protrude partially in the lateral direction in the middle of the longitudinal direction, the liquid crystal molecules being aligned parallel to the first substrate in a no-voltage-applied state where no voltage is applied between the first electrode and the second electrode.

Advantageous Effects of Invention

The present invention enables higher definition and an improved response speed in a horizontal alignment-mode liquid crystal display device.

BRIEF DESCRIPTION OF THE DRAWINGS

FIG. 8(1) shows the off state and FIG. 8(2) shows the on state.

FIG. 11 is a table showing the simulation results of Examples 1 to 4.

FIG. 17 is a table showing the simulation results of Examples 13 to 16.

FIG. 21 is a table showing the simulation results of Examples 21 to 24.

FIG. 25 is a table showing the simulation results of Examples 29 to 32.

FIG. 29 is a table showing the simulation results of Examples 37 to 40.

FIG. 30 is a table showing the simulation results of Examples 41 to 43.

DESCRIPTION OF EMBODIMENTS

Figure 1:
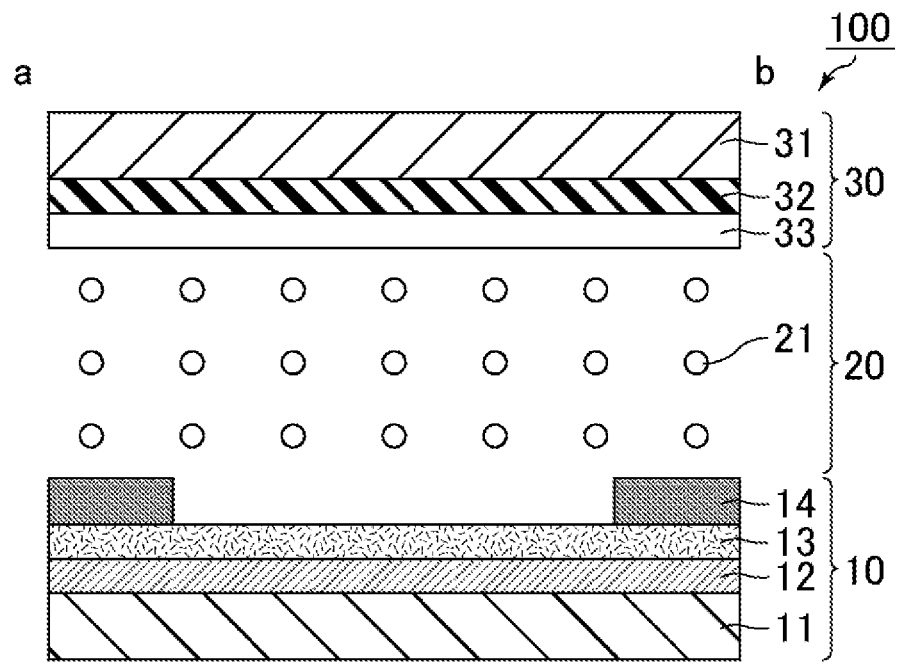
FIG. 1 is a schematic cross-sectional view of a liquid crystal display device of Embodiment 1 in the off state.

Hereinafter, an embodiment of the present invention will be described. The following embodiment, however, is not intended to limit the scope of the present invention. The present invention may appropriately be modified within the scope of the configuration of the present invention. The same components or components having the same or similar function are commonly provided with the same reference sign in the drawings, and description of such components is not repeated. The configurations described in the embodiment may appropriately be combined or modified within the spirit of the present invention.

Embodiment 1

Figure 2:
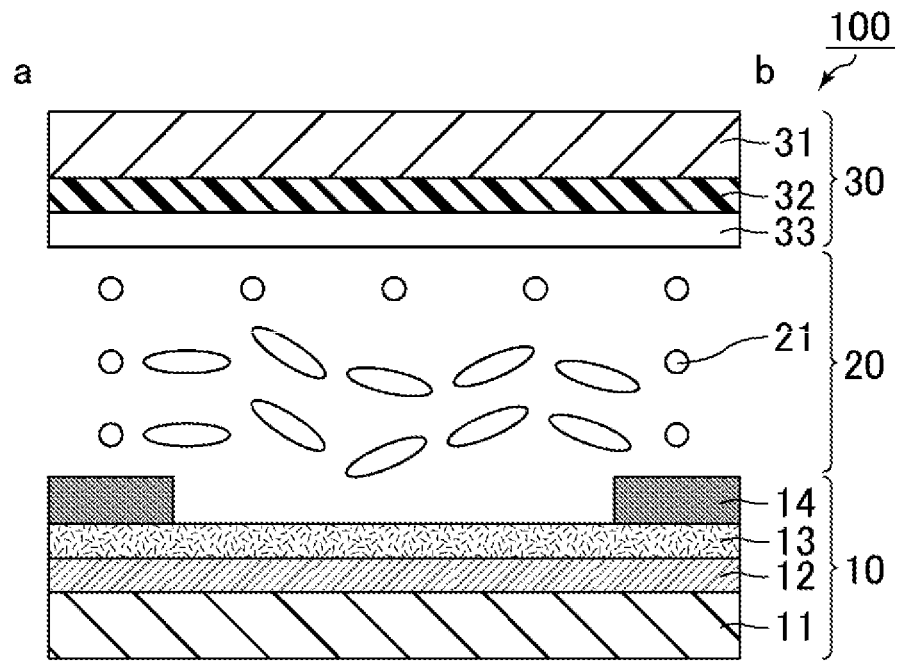
FIG. 2 is a schematic cross-sectional view of the liquid crystal display device of Embodiment 1 in the on state.
Figure 3:
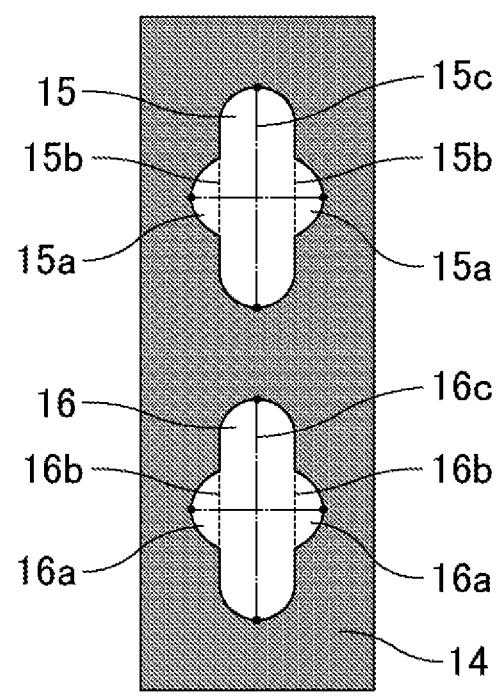
FIG. 3 is a schematic plan view of a counter electrode in the liquid crystal display device of Embodiment 1.
Figure 4:
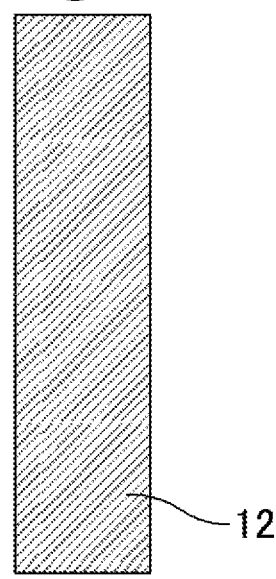
FIG. 4 is a schematic plan view of a pixel electrode in the liquid crystal display device of Embodiment 1.
Figure 5:
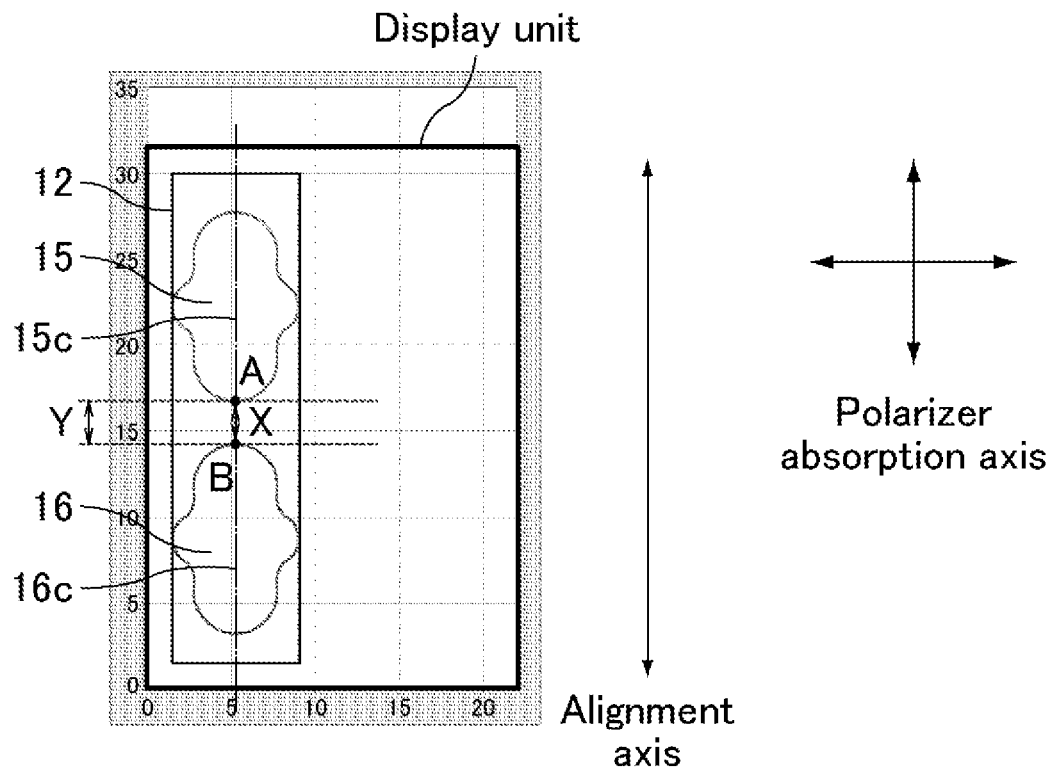
FIG. 5 is a schematic plan view of an exemplary display unit in the liquid crystal display device of Embodiment 1.
Figure 6:
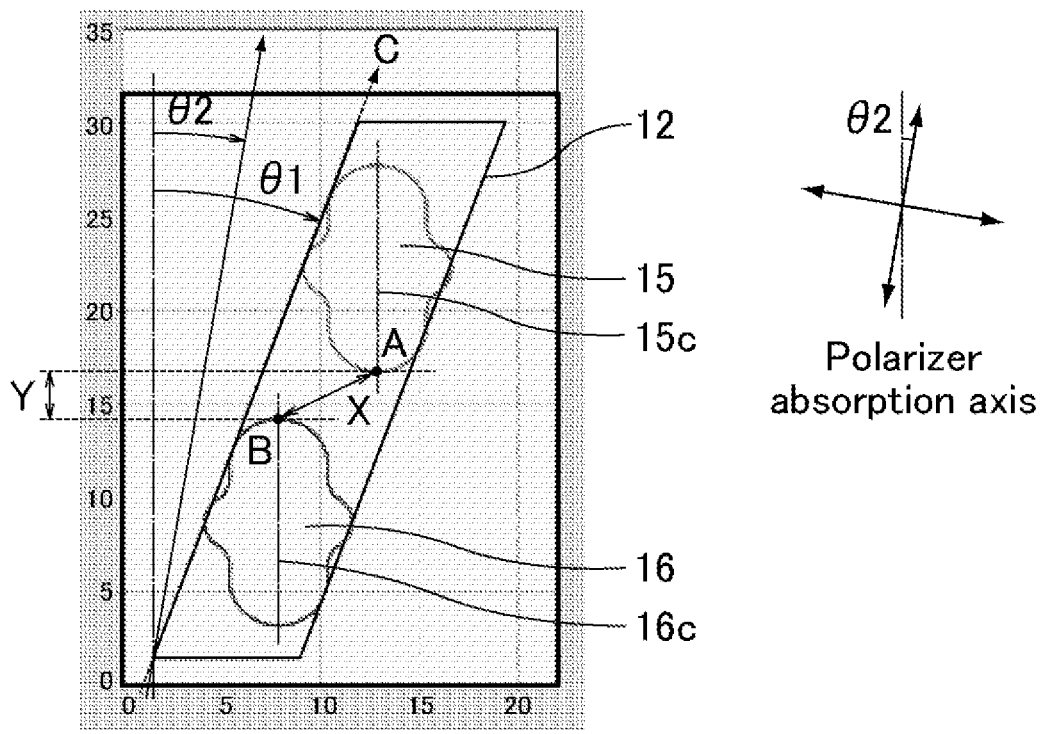
FIG. 6 is a schematic plan view of another exemplary display unit in the liquid crystal display device of Embodiment 1.
Figure 7:
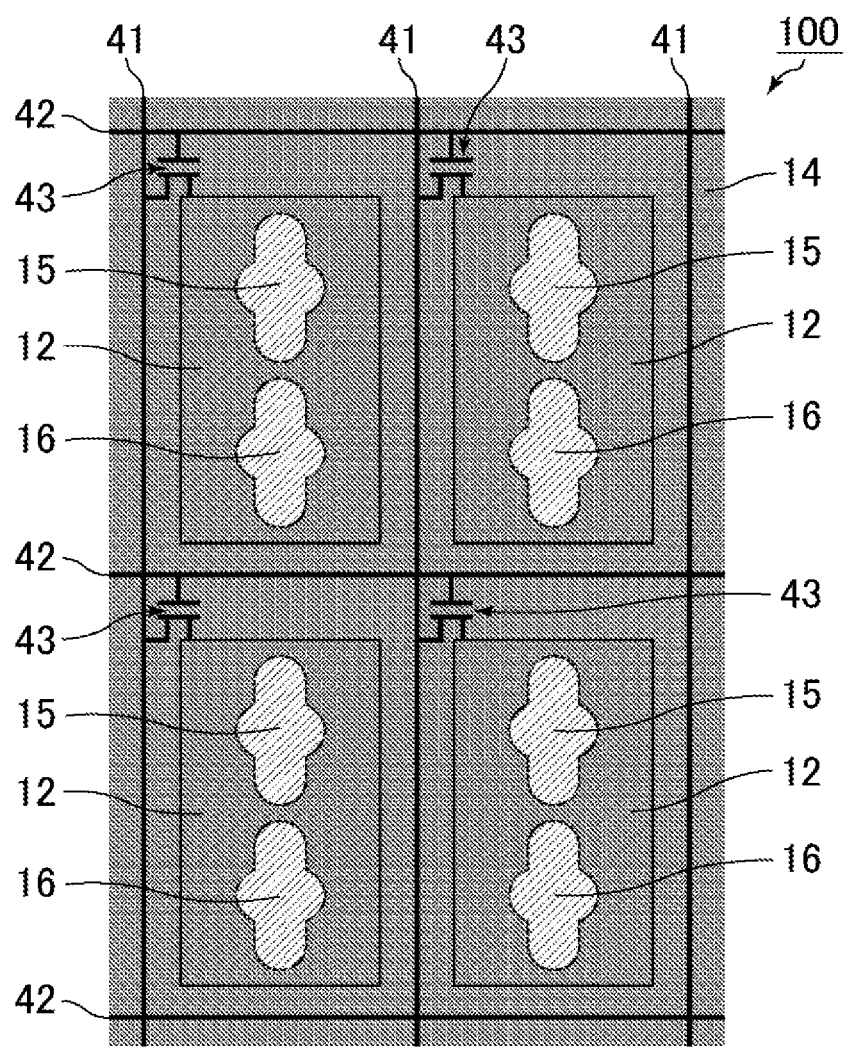
FIG. 7 is a schematic plan view of the liquid crystal display device of Embodiment 1.
Figure 8:
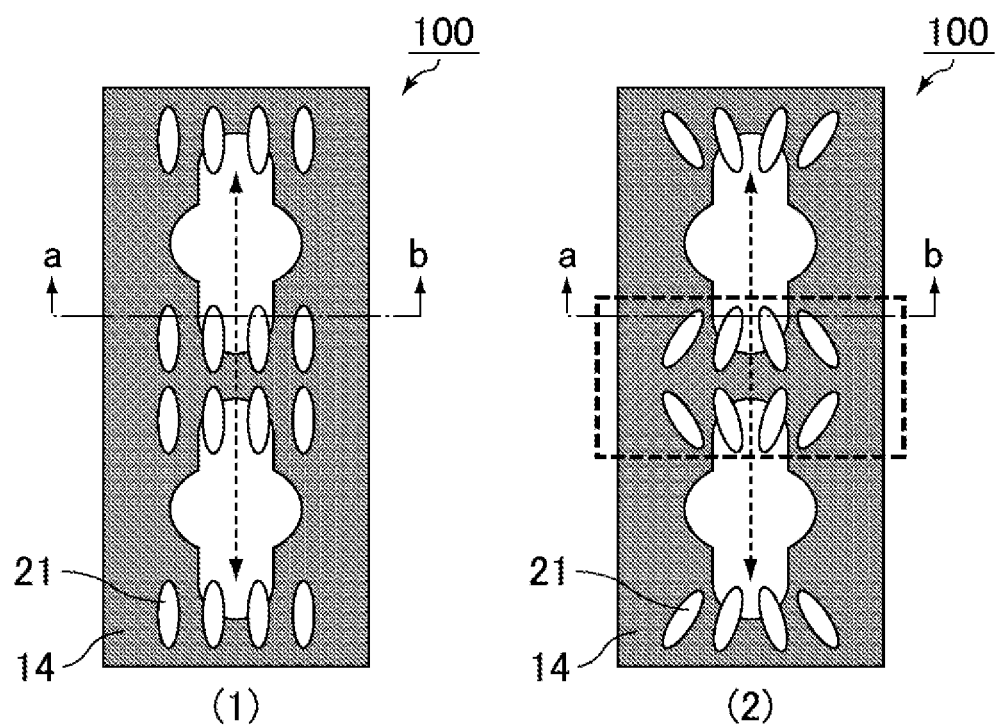
FIGS. 8 schematically illustrate control of the alignment of liquid crystal molecules in the liquid crystal display device of Embodiment 1.

With reference to FIGS. 1 to 8, a liquid crystal display device of Embodiment 1 will be described below. FIG. 1 is a schematic cross-sectional view of a liquid crystal display device of Embodiment 1 in the off state. FIG. 2 is a schematic cross-sectional view of the liquid crystal display device of Embodiment 1 in the on state. FIG. 3 is a schematic plan view of a counter electrode in the liquid crystal display device of Embodiment 1. FIG. 4 is a schematic plan view of a pixel electrode in the liquid crystal display device of Embodiment 1. FIG. 5 is a schematic plan view of an exemplary display unit in the liquid crystal display device of Embodiment 1. FIG. 6 is a schematic plan view of another exemplary display unit in the liquid crystal display device of Embodiment 1. FIG. 7 is a schematic plan view of the liquid crystal display device of Embodiment 1. FIGS. 8 schematically illustrate control of the alignment of liquid crystal molecules in the liquid crystal display device of Embodiment 1; FIG. 8(1) shows the off state and FIG.

8(2) shows the on state. The cross-sections shown in FIG. 1 and FIG. 2 are taken along the a-b line in FIG. 8.

As shown in FIG. 1, a liquid crystal display device 100 of Embodiment 1 includes, in the given order, a first substrate 10, a liquid crystal layer 20 containing liquid crystal molecules 21, and a second substrate 30. The first substrate 10 is a TFT array substrate and has a stacked structure including, in the order toward the liquid crystal layer 20, a first polarizer (not shown), an insulating substrate (e.g., glass substrate) 11, a pixel electrode (first electrode) 12, an insulating layer (insulating film) 13, and a counter electrode (second electrode) 14. The second substrate 30 is a color filter substrate and has a stacked structure including, in the order toward the liquid crystal layer 20, a second polarizer (not shown), an insulating substrate (e.g., glass substrate) 31, a color filter 32, and an overcoat layer 33. The first polarizer and the second polarizer are both absorptive polarizers and disposed in the crossed Nicols with their absorption axes perpendicular to each other.

Although not shown in FIG. 1, a horizontal alignment film is typically disposed on the surface closer to the liquid crystal layer 20 of the first substrate 10 and/or the second substrate 30. The horizontal alignment film acts to align liquid crystal molecules near the film parallel to the film surface. In addition, the horizontal alignment film adjusts the orientations of the major axes (hereinafter also referred to as "alignment azimuths") of the liquid crystal molecules 21 aligned parallel to the first substrate 10 to a specific in-plane azimuth. The horizontal alignment film has preferably been subjected to alignment treatment such as photo-alignment treatment or rubbing treatment. The horizontal alignment film may be made of an inorganic material or an organic material.

The alignment mode of the liquid crystal display device 100 is the fringe field switching (FFS) mode.

In the no-voltage-applied state (the off state) where no voltage is applied between the pixel electrode 12 and the counter electrode 14, the alignment of the liquid crystal molecules 21 are controlled to be parallel to the first substrate 10. The "parallel" herein includes not only being completely parallel, but also a range that can be equated with being parallel (substantially parallel) in the field of the art. The pre-tilt angle (inclination angle in the off state) of the liquid crystal molecules 21 is preferably smaller than 3°, more preferably smaller than 1° relative to the surface of the first substrate 10.

In the liquid crystal layer 20 in the voltage-applied state (the on state), the alignment of the liquid crystal molecules 21 is controlled by the stacked structure of the first substrate 10 including the pixel electrode 12, the insulating layer 13, and the counter electrode 14. The pixel electrode 12 is an electrode provided for each display unit. The counter electrode 14 is an electrode common to multiple display units. The "display unit" means a region corresponding to one pixel electrode 12. The display unit may be one called "pixel" in the technical field of liquid crystal display devices, or may be one called "sub-pixel" or "dot" in cases where one pixel is divided for driving.

The positions of the counter electrode 14 and the pixel electrode 12 may be switched. Specifically, although the counter electrode 14 is adjacent to the liquid crystal layer 20 via a horizontal alignment film (not shown) in the stacked structure shown in FIG. 1, the pixel electrode 12 may be adjacent to the liquid crystal layer 20 via the horizontal alignment film (not shown). In such a case, a first opening 15 and a second opening 16 described later are formed not in the counter electrode 14 but in the pixel electrode 12.

As shown in FIG. 3, the counter electrode 14 is provided with openings including the first opening 15 and the second opening 16 adjacent to each other. The first opening 15 and the second opening 16 are used for formation of a fringe electric field (oblique electric field). The first opening 15 and the second opening 16 are preferably provided per display unit, and preferably provided for all the display units.

The first opening 15 and the second opening 16 each have a shape including: curved portions that expand an opening periphery outward at the respective ends in the longitudinal direction; and paired protruding portions 15a and 16a, respectively, that allow the opening periphery to protrude partially in the lateral direction in the middle of the longitudinal direction. As shown in FIG. 3, taking the paired protruding portions 15a as an example, without consideration of the protruding portions, the opening periphery protrudes to the counter electrode 14 sides from reference lines 15b (dotted lines in FIG. 3) that are the straight lines linking the peripheral portions in the longitudinal direction of the first opening 15. This peripheral shape includes no complicated shape, and thus can be applied to ultra-high-definition pixels of 800 ppi or more, for example. Further, the first opening 15 and the second opening 16 each have a shape including curved portions that expand the opening periphery outward at the respective ends in the longitudinal direction, and thus bend-align liquid crystal molecules at the curved portions when a voltage is applied. The force caused by this distortion can improve the response speed of liquid crystal molecules.

In order to align liquid crystal molecules more symmetrically near the periphery of the first opening 15 and the periphery of the second opening 16, the shapes of the first opening 15 and the second opening 16 each may include linear portions facing each other in the longitudinal direction. In other words, the peripheral shape of the first opening 15 and the peripheral shape of the second opening 16 each may be constituted by linear portions facing each other and two curved portions that link the ends of the linear portions and protrude to the second electrode sides. Further, the shapes of the first opening and the second opening each may include paired protruding. portions in the middle of the respective linear portions. The linear portions preferably have the same length. The angle formed by one of the linear portions facing each other relative to the other linear portion is preferably −2° to +5°, more preferably 0°. The curved portions each have only to partially include a curve, and may have a polygonal shape with at least one corner being rounded. In order to align liquid crystal molecules more symmetrically, the curved portions are preferably circular arcs.

The presence of the protruding portions 15a and 16a can stabilize the alignment of liquid crystal molecules when a voltage is applied and immobilize a disclination in the first opening 15 and the second opening 16, respectively. This seems to result in an improved transmittance and response speed. The presence of the paired protruding portions protruding in the opposite directions seems to allow each of the first opening 15 and the second opening 16 to form four alignment regions symmetrical about the longitudinal direction and the lateral direction of the opening, improving the response speed. In order to form more highly symmetrical four alignment regions, the first opening 15 and the second opening 16 each preferably have a shape symmetrical about the longitudinal direction and the lateral direction of the opening. The peripheral shape of each of the protruding portions 15a and 16a preferably includes a curved shape, and may be a polygonal shape with at least one corner being rounded. The peripheral shape of each of the protruding portions 15a and 16a is more preferably a circular arc.

The protruding portions 15c and 16c are preferably positioned at a longitudinally middle portion of the first opening 15 and the second opening 16, respectively. As shown in FIG. 3, in each of the first opening 15 and the second opening 16, the straight line linking the vertices of the curved portions and the straight line linking the vertices of the paired protruding portions may be perpendicular to each other. The straight line linking the vertices of the curved portions and the straight line linking the vertices of the paired protruding portions may cross at the middle points thereof.

The first opening 15 and the second opening 16 each may have a length in the longitudinal direction of 5 µm to 15 µm. The first opening 15 and the second opening 16 each may have a width of 3 µm to 9 µm. The length in the longitudinal direction means the length of the straight line linking the vertices of the curved portions. The width means the length of the straight line linking the vertices of the paired protruding portions. The ratio of the width to the length in the longitudinal direction of each of the first opening 15 and the second opening 16 may be 1 to 5. The first opening 15 and the second opening 16 each having the above size are suitable for high definition with a resolution of 700 ppi (sub pixel 12 µm×36 µm) to 1600 ppi (sub pixel 5.3 µm×15.9 µm).

The first opening 15 and the second opening 16 are independent of each other and point-symmetrical to each other. The expression "independent of each other" means the first opening 15 and the second opening 16 are not linked with each other and each of them is surrounded by the counter electrode 14. The expression "point-symmetrical" means the first opening 15 and the second opening 16 overlap 75% or more when one of the openings is inverted about the point of symmetry (center of symmetry). This point-symmetrical arrangement of the first opening 15 and the second opening 16 allows liquid crystal molecules to have symmetrical alignment azimuths in the alignment regions adjacent to each other between the first opening 15 and the second opening 16. The independent and point-symmetrical arrangement of the first opening 15 and the second opening 16 allows liquid crystal molecules 21 to be divided into four alignment regions in which the alignment azimuths of the liquid crystal molecules 21 are in a rotationally symmetrical relationship in each of the first opening 15 and the second opening 16 in the voltage-applied state where a voltage is applied between the pixel electrode 12 and the counter electrode 14. There is a crossed dark portion (a region where liquid crystal molecules do not move), i.e., disclination, at the center of the four alignment regions, and these moveless liquid crystal molecules seem to serve as a wall that generates a force in the direction opposite to the rotational direction in each of the four alignment regions, improving the response speed. In the four alignment regions, the alignment azimuths of liquid crystal molecules are preferably in a rotationally symmetrical relationship.

Since the counter electrode 14 provides a common potential to the respective display units, it may be formed on almost the entire surface (excluding the openings for producing a fringe electric field) of the first substrate 10. The counter electrode 14 may be electrically connected to an external connecting terminal at the periphery (frame region) of the first substrate 10.

As shown in FIG. 4, the pixel electrode 12 is a planar electrode with no opening. The pixel electrode 12 and the counter electrode 14 are stacked together via the insulating layer 13. As shown in FIG. 7, in a plan view, each pixel electrode 12 is positioned under the corresponding first opening 15 and second opening 16 in the counter electrode 14. Thus, when a potential difference is generated between a pixel electrode 12 and the counter electrode 14, a fringe electric field is generated around the first opening 15 and the second opening 16 in the counter electrode 14. Each of the first openings 15 and the second openings 16 preferably entirely overlap the corresponding pixel electrode 12.

With reference to FIG. 5 and FIG. 6, the arrangement of the first opening 15 and the second opening 16 in a display unit of the liquid crystal display device of Embodiment 1 is described below. In FIG. 5 and FIG. 6, the regions surrounded by bold lines indicate the regions of a display unit (pixel). As shown in FIG. 5 and FIG. 6, the first opening 15 and the second opening 16 each may have a shape including linear portions in the longitudinal direction. The linear portions of the first opening 15 and the linear portions of the second opening 16 are preferably parallel to each other. The arrangement of the linear portions of the two openings so as to be parallel to each other allows liquid crystal molecules to have symmetrical alignment azimuths between the first opening 15 and the second opening 16. The first opening 15 and the second opening 16 are preferably arranged in line in the longitudinal direction of a pixel electrode 12.

The shortest distance Y is preferably 0.5 µm or greater between the straight line that passes a vertex A and is perpendicular to the bisector 15c in the lateral direction of the first opening 15 and the straight line that passes a vertex B and is perpendicular to the bisector 16c in the lateral direction of the second opening 16, where the vertex A represents the vertex of the curved portion closer to the second opening 16 between the curved portions of the first opening 15, and the vertex B represents the vertex of the curved portion closer to the first opening 15 between the curved portions of the second opening 16. The openings with a shortest distance Y of smaller than 0.5 µm may be difficult to pattern and the first opening 15 and the second opening 16 may be linked with each other. The shortest distance Y is preferably 4.5 µm or smaller. The openings with a shortest distance Y of greater than 4.5 µm may have no influence on the alignment of liquid crystal molecules between the first opening 15 and the second opening 16, which may cause too high a transmittance, generating uneven luminance. The bisector 15c in the lateral direction of the first opening 15 means, as shown in FIG. 3, without consideration of the paired protruding portions 15a, the bisector between the reference lines 15b that link the peripheral portions in the longitudinal direction of the first opening 15. The bisector 16c in the lateral direction of the second opening 16 means, as shown in FIG. 3, without consideration of the paired protruding portion 16a, the bisector between the reference lines 16b that link the peripheral portions in the longitudinal direction of the second opening 16. The vertex of a curved portion means the point that most protrudes to the counter electrode 14 side of the curved portion. The bisector 15c in the lateral direction of the first opening 15 preferably passes the vertices of the curved portions of the respective ends in the longitudinal direction of the first opening 15. The bisector 16c in the lateral direction of the second opening 16 preferably passes the vertices of the curved portions of the respective ends in the longitudinal direction of the second opening 16.

The distance X may be 1 µm<X≤5 µm between the vertex A of the curved portion closer to the second opening 16 between the curved portions of the first opening 15 and the vertex B of the curved portion closer to the first opening 15 between the curved portions of the second opening 16. The distance X within the above range can reduce transmittance variation in one display unit and can reduce occurrence of display unevenness in the display screen of the liquid crystal display device.

As shown in FIG. 5, the first opening 15 and the second opening 16 may be arranged in the same straight line. The phrase "arranged in the same straight line" means the bisector 15*c* in the lateral direction of the first opening 15 and the bisector 16*c* in the lateral direction of the second opening 16 are in the same straight line. In this case, the bisectors 15*c* and 16*c* may be parallel to the peripheries in the longitudinal direction of the pixel electrode 12. The linear portions of the first opening 15 and the linear portions of the second opening 16 may be parallel to the peripheries in the longitudinal direction of the pixel electrode 12.

As shown in FIG. 6, the first opening 15 and the second opening 16 may be arranged not in the same straight line but in an oblique direction. In this case, the pixel electrode 12 may be provided for each pixel, and the long sides of each pixel electrode 12 and at least one of the bisector 15*c* in the lateral direction of the first opening 15 and the bisector 16*c* in the lateral direction of the second opening 16 may form an angle θ1 of 18° or smaller. The angle θ1 of 18° or smaller can reduce transmittance variation in one display unit, and can reduce occurrence of display unevenness in the display screen of the liquid crystal display device. At least one of the bisectors 15*c* and 16*c* may be parallel to the longitudinal direction of a pixel.

The value Z represented by the following formula (1) may be 0.5 μm≤Z<2.5 μm.

$$Z=X-Y \tag{1}$$

In the formula (1), X represents the distance between the vertex A of the curved portion closer to the second opening between the curved portions of the first opening and the vertex B of the curved portion closer to the first opening between the curved portions of the second opening; and Y represents the shortest distance between the straight line that passes the vertex A and is perpendicular to the bisector in the lateral direction of the first opening and the straight line that passes the vertex B and is perpendicular to the bisector in the lateral direction of the second opening.

The value Z within the above range can reduce transmittance variation in one display unit, and can reduce occurrence of display unevenness in the display screen of the liquid crystal display device.

The counter electrode 14 has only to be provided with openings at least including the first opening 15 and the second opening 16, and may be provided with another opening.

As shown in FIG. 5, in a plan view, the alignment azimuth (alignment axis) of the liquid crystal molecules in the no-voltage-applied state and the extending direction of the long sides of the pixel electrode 12 may be parallel to each other. In this case, the angle θ2 is preferably 0° or greater and 1.2° or smaller, where the angle θ2 represents the angle formed by at least one of the bisector 15*c* in the lateral direction of the first opening 15 and the bisector 16*c* in the lateral direction of the second opening 16 and the alignment azimuth of the liquid crystal molecules in the no-voltage-applied state. The θ2 is more preferably 0°. As shown in FIG. 6, when the long sides of the pixel electrode 12 and at least one of the bisector 15*c* in the lateral direction of the first opening 15 and the bisector 16*c* in the lateral direction of the second opening 16 form an angle θ1, the alignment axis may be changed in accordance with the angle θ1. In the no-voltage-applied state where no voltage is applied between the pixel electrode 12 and the counter electrode 14, the alignment azimuth of liquid crystal molecules and the extending direction of the long sides of the pixel electrode 12 may be parallel to each other. In this case, the angle θ2 is preferably θ1±1.2°. The initial alignment azimuth of liquid crystal molecules can be given by applying alignment treatment such as rubbing treatment or photo-alignment treatment to the alignment film.

As shown in FIG. 7, the drain of a TFT 43 is electrically connected to the corresponding pixel electrode 12. To the gate of the TFT 43 is electrically connected a gate signal line 42, and to the source of the TFT 43 is electrically connected a source signal line 41. Thus, the switching on/off of the TFT 43 is controlled by scanning signals input to the gate signal line 42. When the TFT 43 is on, data signals (source voltage) input to the source signal line 41 are provided to the pixel electrode 12 through the TFT 43. As described here, in the voltage-applied state (the on state), a source voltage is applied to the pixel electrode 12 that is a lower layer through the TFT 43, so that a fringe electric field is generated between the pixel electrode 12 and the counter electrode 14 that is disposed in an upper layer via the insulating film 13. The TFT 43 preferably has a channel formed from indium-gallium-zinc-oxygen (IGZO) which is an oxide semiconductor. As shown in FIG. 7, the first openings 15 and the second openings 16 in adjacent display units in the counter electrode 14 are preferably arranged in line in the row direction and/or the column direction. This arrangement can stabilize the alignment of liquid crystal molecules in the voltage-applied state.

The insulating layer 13 between the pixel electrode 12 and the counter electrode 14 may be, for example, an organic film (dielectric constant ε=3 to 4), an inorganic film (dielectric constant ε=5 to 7) such as a silicon nitride (SiNx) film or a silicon oxide (SiO$_2$) film, or a multilayer film containing any of these films.

The liquid crystal molecules 21 may have either a negative or positive value for the anisotropy of dielectric constant (Δε) defined by the formula below. In other words, the liquid crystal molecules 21 may have either negative anisotropy of dielectric constant or positive anisotropy of dielectric constant. Liquid crystal materials containing liquid crystal molecules 21 having negative anisotropy of dielectric constant tend to have a relatively high viscosity. Thus, liquid crystal materials containing liquid crystal molecules 21 having positive anisotropy of dielectric constant are advantageous in order to achieve a high-speed response. Even liquid crystal materials having negative anisotropy of dielectric constant can achieve a similar effect by means of the features of the present embodiment when they have a viscosity as low as that of liquid crystal materials having positive anisotropy of dielectric constant. The initial alignment azimuth of liquid crystal molecules having negative anisotropy of dielectric constant is 90° rotated relative to that of liquid crystal molecules having positive anisotropy of dielectric constant.

Δε=(dielectric constant in the major axis direction)−(dielectric constant in the minor axis direction)

In a plan view, the alignment azimuth of liquid crystal molecules 21 in the no-voltage-applied state (the off state) is parallel to the absorption axis of either one of the first polarizer and the second polarizer, and perpendicular to the absorption axis of the other. The control mode of the liquid crystal display device 100 is thus what is called a normally black mode, which provides black display when the liquid crystal layer 20 is in the no-voltage-applied state (the off state).

The second substrate 30 may be any color filter substrate typically used in the field of liquid crystal display devices. The overcoat layer 33 flattens the liquid crystal layer 20 side surface of the second substrate 30, and may be an organic film (dielectric constant ε=3 to 4).

The first substrate 10 and the second substrate 30 are typically bonded to each other with a sealing material applied to surround the periphery of the liquid crystal layer 20. The first substrate 10, the second substrate 30, and the sealing material hold the liquid crystal layer 20 in a predetermined region. Examples of the sealing material include epoxy resins containing inorganic or organic filler and a curing agent.

The liquid crystal display device 100 may include components such as a backlight; optical films (e.g., a retardation film, a viewing angle-increasing film, and a luminance-increasing film); external circuits (e.g., a tape-carrier package (TCP) and a printed circuit board (PCB)); and a bezel (frame), in addition to the first substrate 10, liquid crystal layer 20, and second substrate 30. These components are not limited, and may be those usually used in the field of liquid crystal display devices. The description of these components is thus omitted.

The operation of the liquid crystal display device 100 will be described hereinbelow. FIG. 1 shows the no-voltage-applied state (the off state), where no voltage is applied between the pixel electrode 12 and the counter electrode 14. In the liquid crystal layer 20 in the off state, no electric field is generated and the liquid crystal molecules 21 are aligned parallel to the first substrate 10, as shown in FIG. 1. Since the alignment azimuth of the liquid crystal molecules 21 is parallel to the absorption axis of one of the first polarizer and the second polarizer, and since the first polarizer and the second polarizer are disposed in the crossed Nicols, the liquid crystal panel in the off state does not transmit light and provides black display.

As shown in FIG. 8(1), the alignment azimuth of the liquid crystal molecules 21 in the off state in a plan view may be parallel to the long sides of the pixel electrodes 12. FIG. 2 shows the voltage-applied state (the on state), where a voltage is applied between the pixel electrode 12 and the counter electrode 14. In the liquid crystal layer 20 in the on state, an electric field according to the level of the voltage between the pixel electrode 12 and the counter electrode 14 is generated. Specifically, since the openings are formed in the counter electrode 14 arranged closer to the liquid crystal layer than the pixel electrode 12 is, a fringe electric field is generated around the openings. The liquid crystal molecules 21 rotate under the effect of the electric field to change their alignment azimuth from the alignment azimuth in the off state (see FIG. 8(1)) to the alignment azimuths in the on state (see FIG. 8(2)). The liquid crystal panel in the on state thus transmits light to provide white display.

Each and every detail described for the above embodiment of the present invention shall be applied to all the aspects of the present invention.

The present invention is described below in more detail based on examples. The examples, however, are not intended to limit the scope of the present invention.

EXAMPLE 1

A liquid crystal display device of Example 1 is a specific example of the liquid crystal display device 100 of Embodiment 1 and has the following structure.

For the counter electrode 14 of the liquid crystal display device 100, the first opening 15 and the second opening 16 were formed so as to have the respective shapes as drawn with the solid lines in FIG. 3. The bisector 15c in the lateral direction of the first opening 15 and the bisector 16c in the lateral direction of the second opening 16 were arranged so as to be in the same straight line. As shown in FIG. 5, the angle θ1 was set to 0° between the long sides of the pixel electrode 12 and each of the bisector 15c in the lateral direction of the first opening 15 and the bisector 16c in the lateral direction of the second opening 16. The shortest distance Y was set to 0.5 μm between the straight line that passes the vertex A of the first opening 15 and is perpendicular to the bisector 15c in the lateral direction of the first opening 15 and the straight line that passes the vertex B of the first opening 15 and is perpendicular to the bisector 16c in the lateral direction of the second opening 16. The alignment azimuth (alignment axis) of the liquid crystal molecules 21 in the no-voltage-applied state where no voltage is applied between the pixel electrode 12 and the counter electrode 14 is set to be parallel to the linear portions of the first opening 15 and the linear portions of the second opening 16 (angle θ2=0°). For the liquid crystal layer 20, the refractive index anisotropy (Δn) was set to 0.11, the in-plane retardation (Re) was set to 310 nm, the viscosity was set to 70 cps, and the anisotropy of dielectric constant (Δε) of the liquid crystal molecules 21 was set to 7 (positive). The polarizer was what is called a normally black mode polarizer that provides black display in a state (the off state) where no voltage is applied to the liquid crystal layer 20. The size of the display unit (sub pixel) was estimated to be 10.5 μm×31.5 μm, and the simulation area was set to 31.5 μm×22.0 μm.

Figure 9:
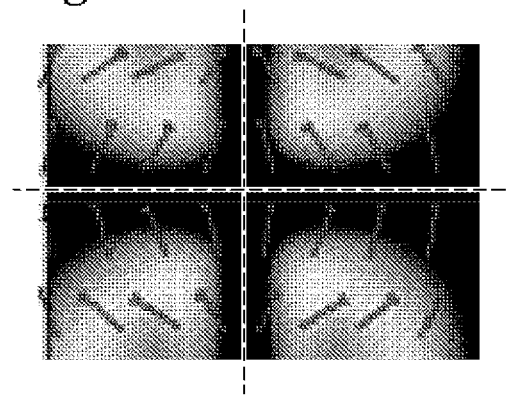
FIG. 9 is an enlarged plan view showing the simulation result of the distribution of the alignments of liquid crystal molecules in the region surrounded by the dotted line in FIG. 8(2).
Figure 10:
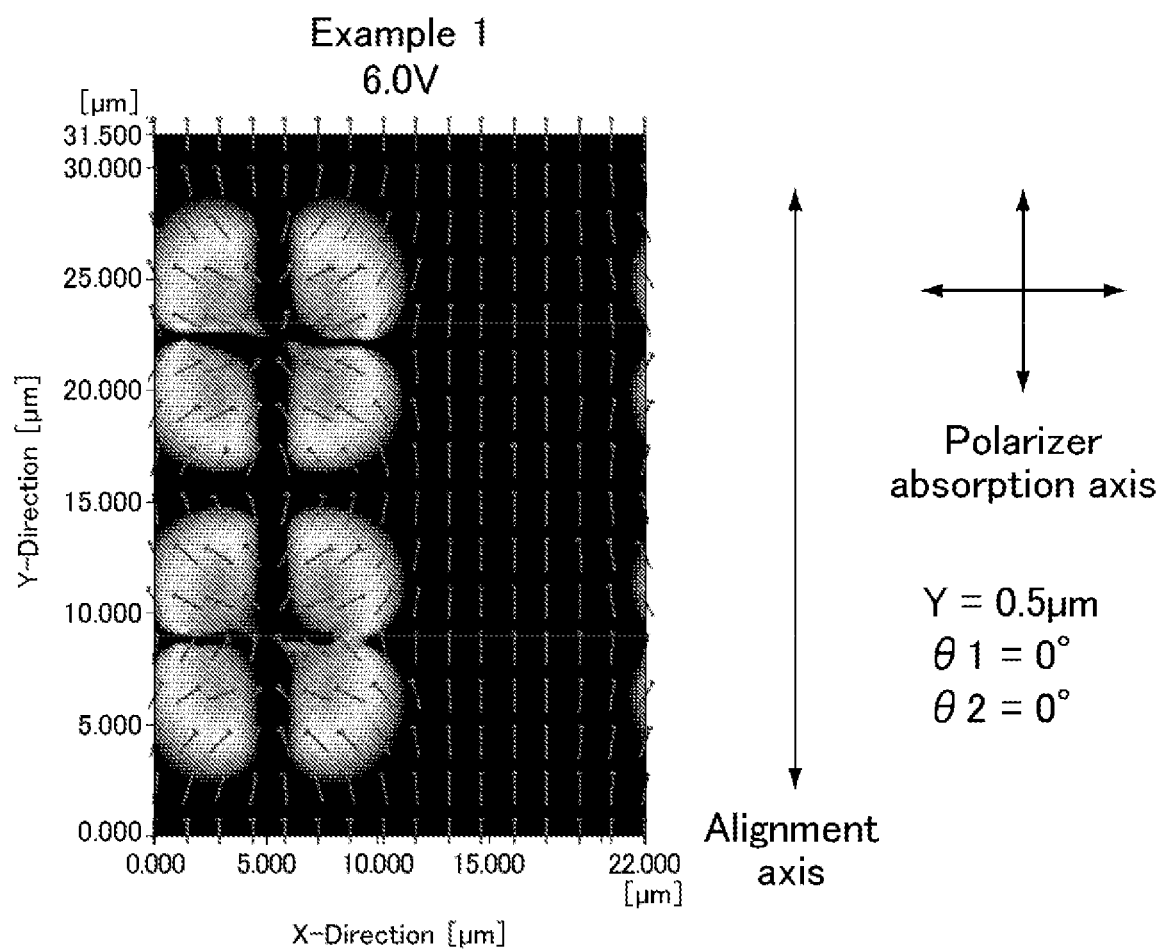
FIG. 10 is a plan view showing the simulation results of Example 1.

The distribution of the alignments of liquid crystal molecules in the on state was simulated using LCD-Master 3D (Shintech Inc.), and a simulation photograph per display unit was obtained. The applied voltages for the simulation were 5.0 V at which the alignment state of liquid crystal molecules are likely to be stable and 6.0 V which is a high voltage and thus causes an unstable alignment state of liquid crystal molecules, easily causing transmittance variation. FIG. 9 is an enlarged plan view showing the simulation result of the distribution of the alignments of liquid crystal molecules in the region surrounded by the dotted line in FIG. 8(2). FIG. 10 is a plan view showing the simulation results of Example 1.

As shown in FIG. 10, four alignment regions were formed in the 45° directions from the center of each of the first opening 15 and the second opening 16, and thus eight alignment regions were present in one display unit. For each of the first opening 15 and the second opening 16, liquid crystal molecules were aligned in the 45° directions from the center of the opening and were sufficiently rotated in an early stage of voltage application. Thus, a high transmittance was achieved. In the four alignment regions formed for each of the first opening 15 and the second opening 16, liquid crystal molecules are bend-aligned. The force caused by this distortion allows liquid crystal molecules to respond rapidly. The presence of the protruding portions in each of the first opening 15 and the second opening 16 enables maintenance of the symmetry of the four alignment regions even at a high voltage (6.0 V), leading to rapid performance. As shown in FIG. 9, liquid crystal molecules were symmetrically aligned even between the first opening 15 and the second opening 16. This demonstrates that the transmittance is high and the alignment is stable.

EXAMPLE 2 to EXAMPLE 4

Liquid crystal display devices of Examples 2 to 4 each have the same structure as the liquid crystal display device of Example 1, except that the distance Y was changed to 1.5 µm, 2.5 µm, and 4.5 µm, respectively. Simulation was performed at a distance Y of 1.5 µm, as a reference, as well as at 0.5 µm, and 2.5 µm, in consideration of variations among production steps. Also, the case of Y=4.5 µm, was simulated at which the alignment regions are less likely to be affected by each other at the boundary between the adjacent first opening 15 and second opening 16.

The liquid crystal display devices of Examples 2 to 4 were also subjected to simulations at applied voltages of 5.0 V and of 6.0 V in the same manner as in Example 1. FIG. 11 is a table showing the simulation results of Examples 1 to 4. The cases where the transmittance difference was lower than 1% were evaluated as excellent, the transmittance difference of 1% or higher and lower than 1.5% as good, and the transmittance difference of 1.5% or higher as fair. The transmittance difference indicates the difference calculated as follows: applying a voltage of 5.0 V or 6.0 V to the liquid crystal display device of Example 2 (Y=1.5 µ, θ1=0°, θ2=0°); calculating the transmittance of each example at a gray scale value of 255, with the transmittance at a gray scale value of 255 for each voltage taken as a reference (100%); and subtracting the calculated value from 100%. A transmittance difference of lower than 1% corresponds to a gray scale difference of lower than 1; a transmittance difference of 1% or higher and lower than 1.5% corresponds to a gray scale difference of 1 or higher and lower than 2; and a transmittance difference of 1.5% or higher corresponds to a gray scale difference of 2 or higher. A gray scale difference of lower than 2 is less likely to be observed as luminance unevenness. The gray scale difference indicates the difference between the gray scale value of Example 2 (Y=1.5 µ, θ1=0°, θ2=0°, 5.0 V or 6.0 V applied) and the gray scale value of each example obtained at a gray scale value of 255 with a voltage of 5.0 V or 6.0 V applied thereto.

EXAMPLE 5

Figure 12:
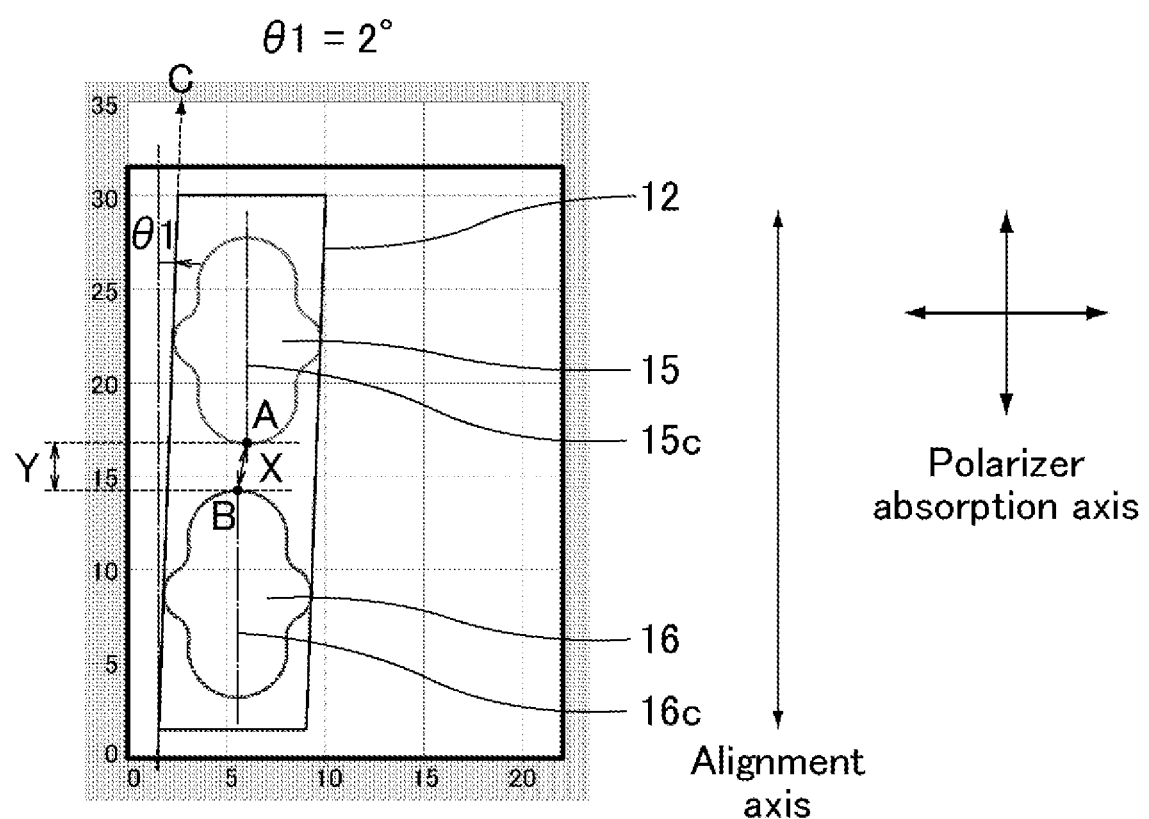
FIG. 12 is a schematic plan view of a display unit in a liquid crystal display device of Example 5.

FIG. 12 is a schematic plan view of a display unit in a liquid crystal display device of Example 5. The liquid crystal display device of Example 5 has the same structure as the liquid crystal display device of Example 1, except that the angle θ1 was changed to 2°.

EXAMPLE 6 to EXAMPLE 8

Liquid crystal display devices of Examples 6 to 8 each have the same structure as the liquid crystal display device of Example 5, except that the distance Y was changed to 1.5 µm, 2.5 µm, and 4.5 µm, respectively.

Figure 13:
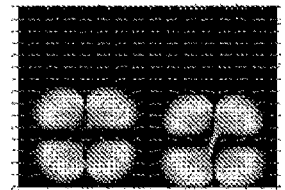
FIG. 13 is a table showing the simulation results of Examples 5 to 8.
Figure 13:
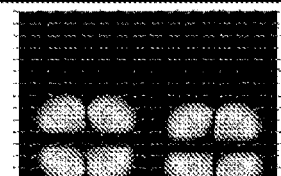
Figure 13:
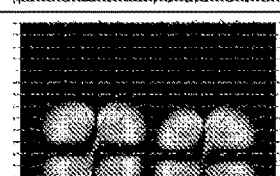
Figure 13:
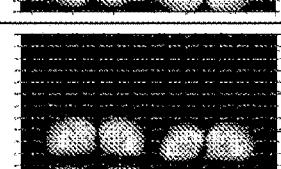

The liquid crystal display devices of Examples 5 to 8 were subjected to simulations at applied voltages of 5.0 V and 6.0 V and evaluated in the same manner as in Example 1. FIG. 13 is a table showing the simulation results in a display unit of Examples 5 to 8.

EXAMPLE 9

Figure 14:
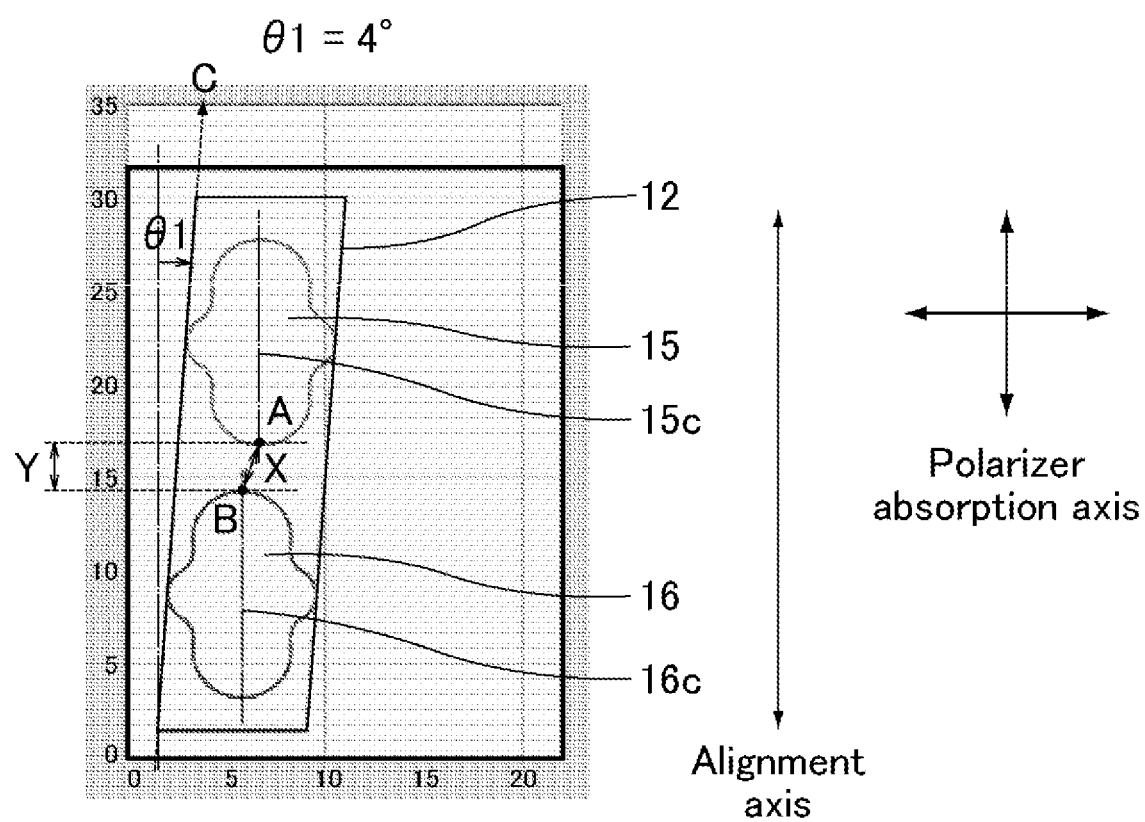
FIG. 14 is a schematic plan view of a display unit in a liquid crystal display device of Example 9.

FIG. 14 is a schematic plan view of a display unit in a liquid crystal display device of Example 9. A liquid crystal display device of Example 9 has the same structure as the liquid crystal display device of Example 1, except that the angle θ1 was changed to 4°.

EXAMPLE 10 to EXAMPLE 12

Liquid crystal display devices of Examples 10 to 12 each have the same structure as the liquid crystal display device of Example 9, except that the distance Y was changed to 1.5 µm, 2.5 µm, and 4.5 µm, respectively.

Figure 15:
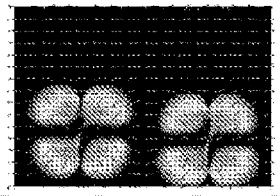
FIG. 15 is a table showing the simulation results of Examples 9 to 12.
Figure 15:
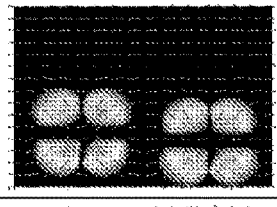
Figure 15:
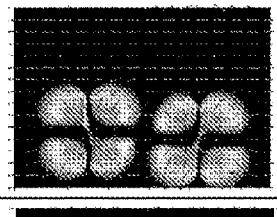
Figure 15:
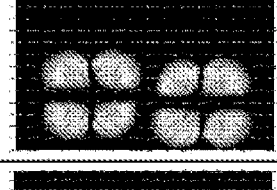

The liquid crystal display devices of Examples 9 to 12 were subjected to simulations at applied voltages of 5.0 V and 6.0 V and evaluated in the same manner as in Example 1. FIG. 15 is a table showing the simulation results of Examples 9 to 12.

EXAMPLE 13

Figure 16:
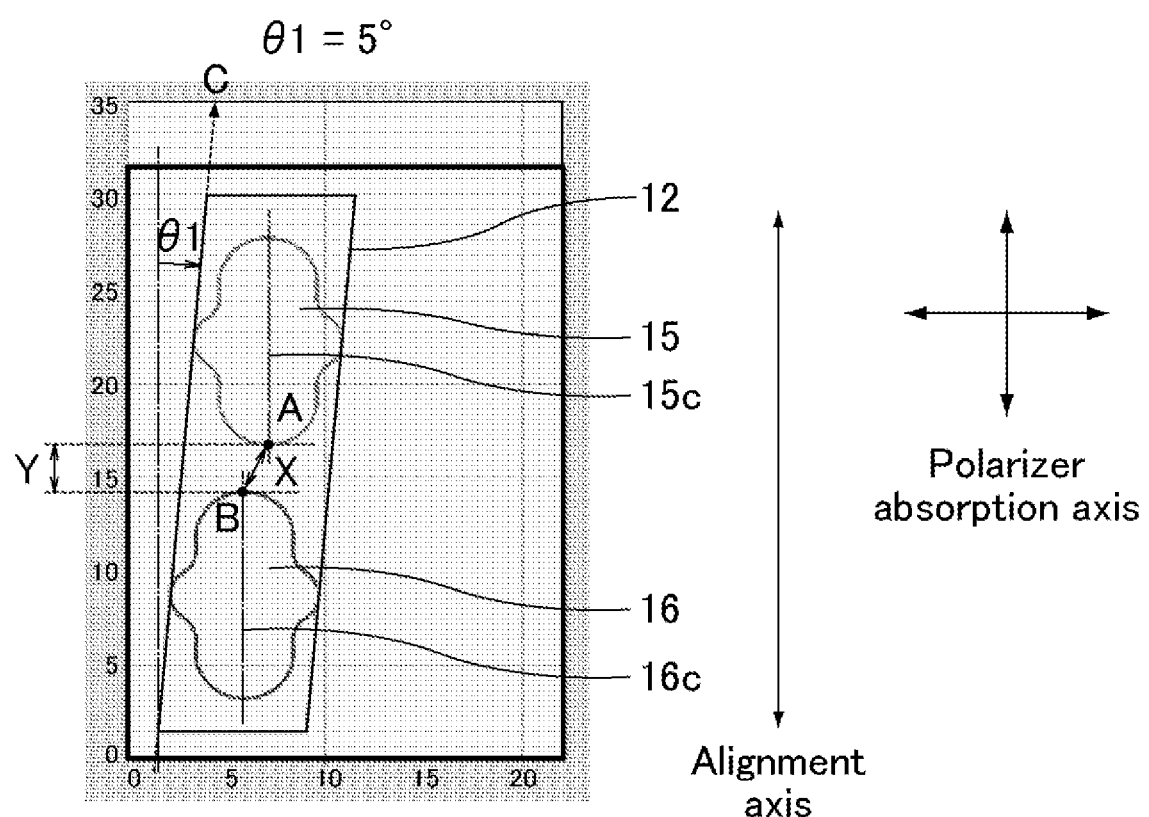
FIG. 16 is a schematic plan view of a display unit in a liquid crystal display device of Example 13.

FIG. 16 is a schematic plan view of a display unit in a liquid crystal display device of Example 13. A liquid crystal display device of Example 13 has the same structure as the liquid crystal display device of Example 1, except that the angle θ1 was changed to 5°.

EXAMPLE 14 to EXAMPLE 16

Liquid crystal display devices of Examples 14 to 16 each have the same structure as the liquid crystal display device of Example 13, except that the distance Y was changed to 1.5 µm, 2.5 µm, and 4.5 µm, respectively.

The liquid crystal display devices of Examples 13 to 16 were subjected to simulations at applied voltages of 5.0 V and 6.0 V and evaluated in the same manner as in Example 1. FIG. 17 is a table showing the simulation results of Examples 13 to 16.

EXAMPLE 17

Figure 18:
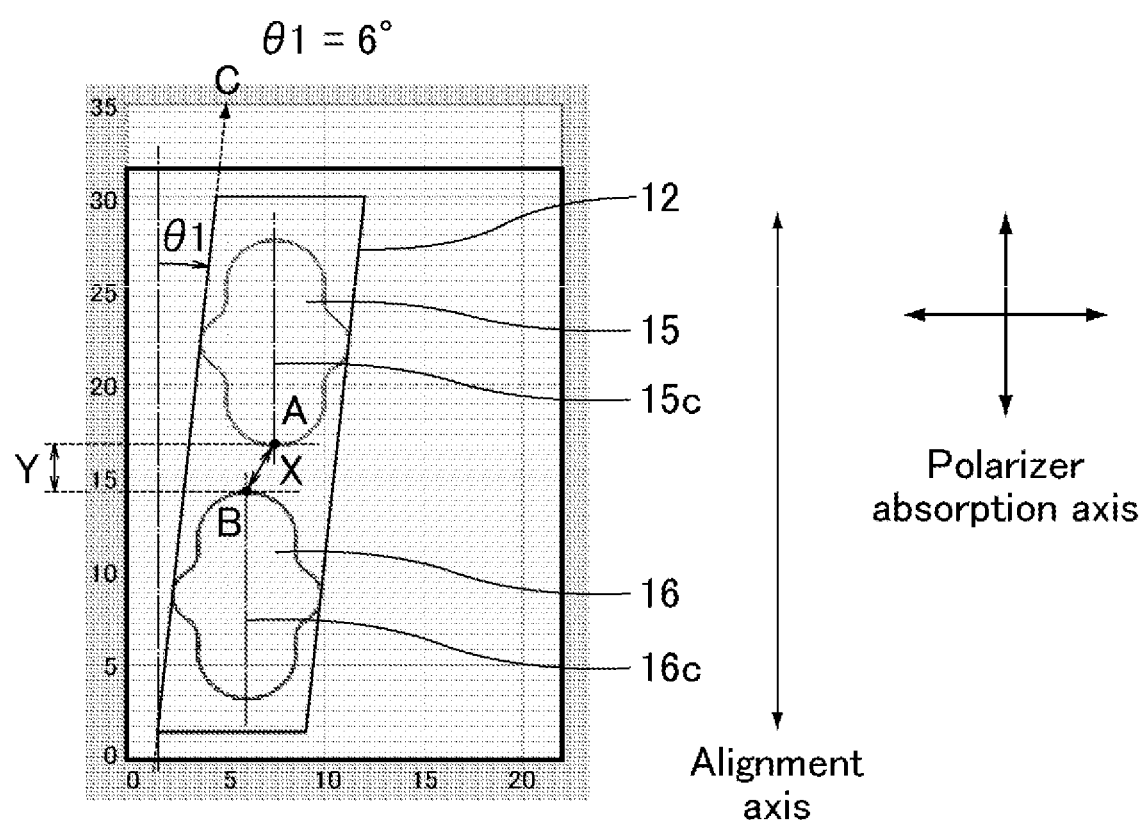
FIG. 18 is a schematic plan view of a display unit in a liquid crystal display device of Example 17.

FIG. 18 is a schematic plan view of a display unit in a liquid crystal display device of Example 17. A liquid crystal display device of Example 17 has the same structure as the liquid crystal display device of Example 1, except that the angle θ1 was changed to 6°.

EXAMPLE 18 to EXAMPLE 20

Liquid crystal display devices of Examples 18 to 20 each have the same structure as the liquid crystal display device of Example 17, except that the distance Y was changed to 1.5 µm, 2.5 µm, and 4.5 µm, respectively.

Figure 19:
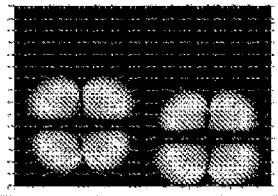
FIG. 19 is a table showing the simulation results of Examples 17 to 20.
Figure 19:
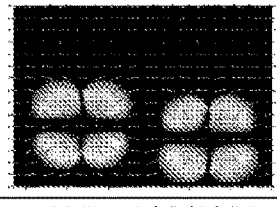
Figure 19:
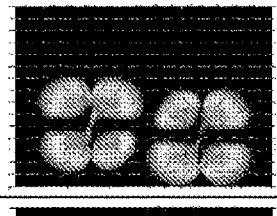
Figure 19:
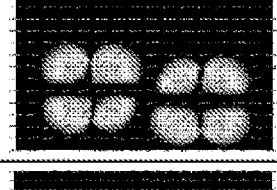

The liquid crystal display devices of Examples 17 to 20 were subjected to simulations at applied voltages of 5.0 V and 6.0 V and evaluated in the same manner as in Example 1. FIG. 19 is a table showing the simulation results of Examples 17 to 20.

EXAMPLE 21

Figure 20:
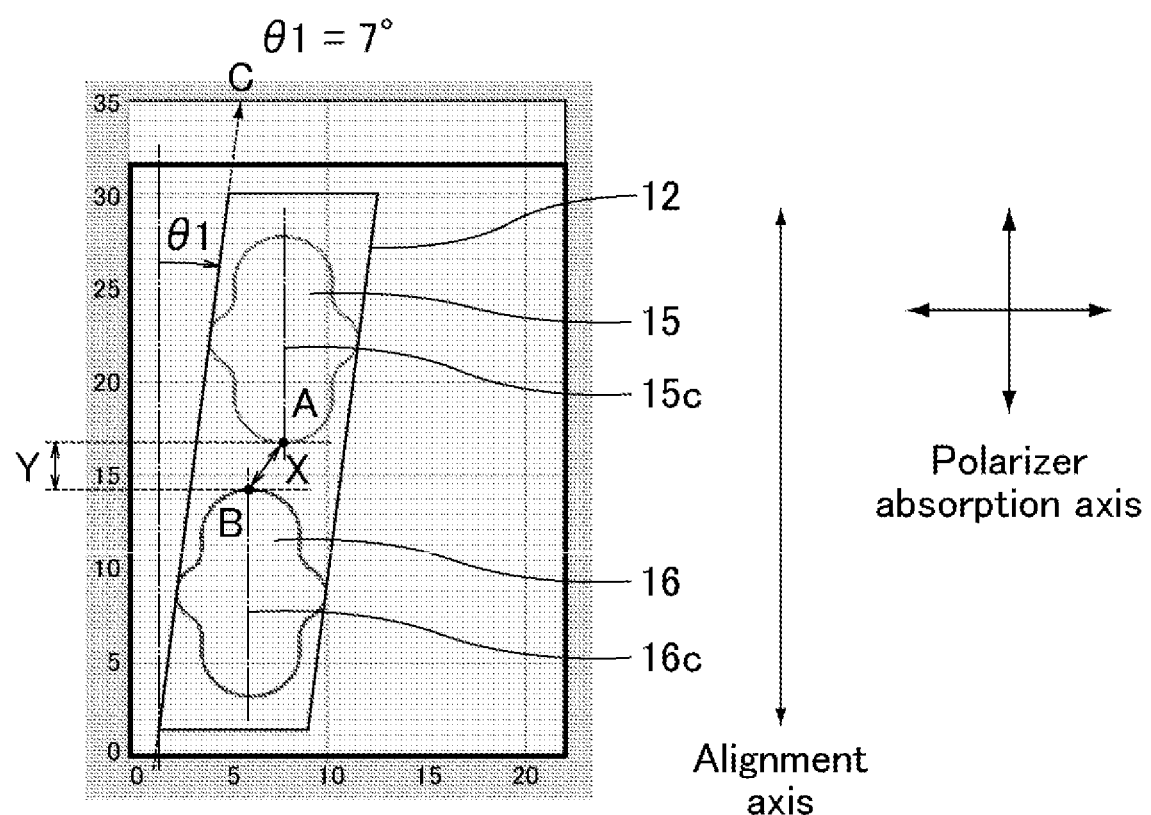
FIG. 20 is a schematic plan view of a display unit in a liquid crystal display device of Example 21.

FIG. 20 is a schematic plan view of a display unit in a liquid crystal display device of Example 21. A liquid crystal display device of Example 21 has the same structure as the liquid crystal display device of Example 1, except that the angle θ1 was changed to 7°.

EXAMPLE 22 to EXAMPLE 24

Liquid crystal display devices of Examples 22 to 24 each have the same structure as the liquid crystal display device of Example 21, except that the distance Y was changed to 1.5 µm, 2.5 µm, and 4.5 µm, respectively.

The liquid crystal display devices of Examples 21 to 24 were subjected to simulations at applied voltages of 5.0 V and 6.0 V and evaluated in the same manner as in Example 1. FIG. 21 is a table showing the simulation results of Examples 21 to 24.

EXAMPLE 25

Figure 22:
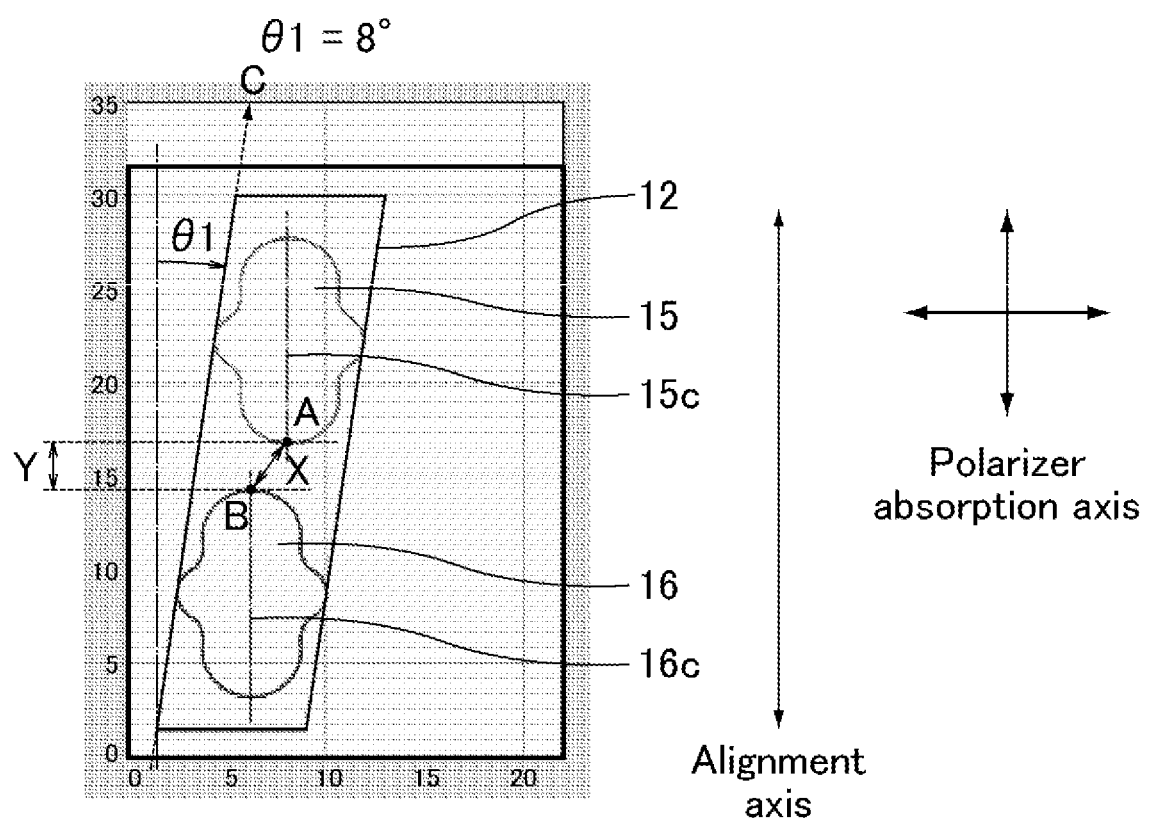
FIG. 22 is a schematic plan view of a display unit in a liquid crystal display device of Example 25.

FIG. 22 is a schematic plan view of a display unit in a liquid crystal display device of Example 25. A liquid crystal display device of Example 25 has the same structure as the liquid crystal display device of Example 1, except that the angle θ1 was changed to 8°.

EXAMPLE 26 to EXAMPLE 28

Liquid crystal display devices of Examples 26 to 28 each have the same structure as the liquid crystal display device of Example 25, except that the distance Y was changed to 1.5 μm, 2.5 μm, and 4.5 μm, respectively.

Figure 23:
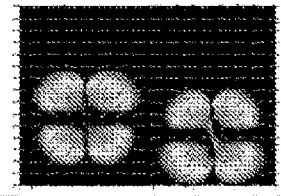
FIG. 23 is a table showing the simulation results of Examples 25 to 28.
Figure 23:
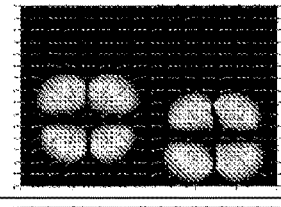
Figure 23:
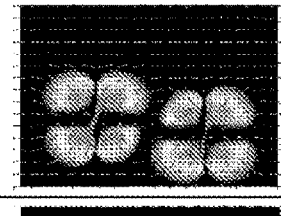
Figure 23:
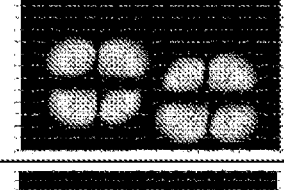

The liquid crystal display devices of Examples 25 to 28 were subjected to simulations at applied voltages of 5.0 V and 6.0 V and evaluated in the same manner as in Example 1. FIG. 23 is a table showing the simulation results of Examples 25 to 28.

EXAMPLE 29

Figure 24:
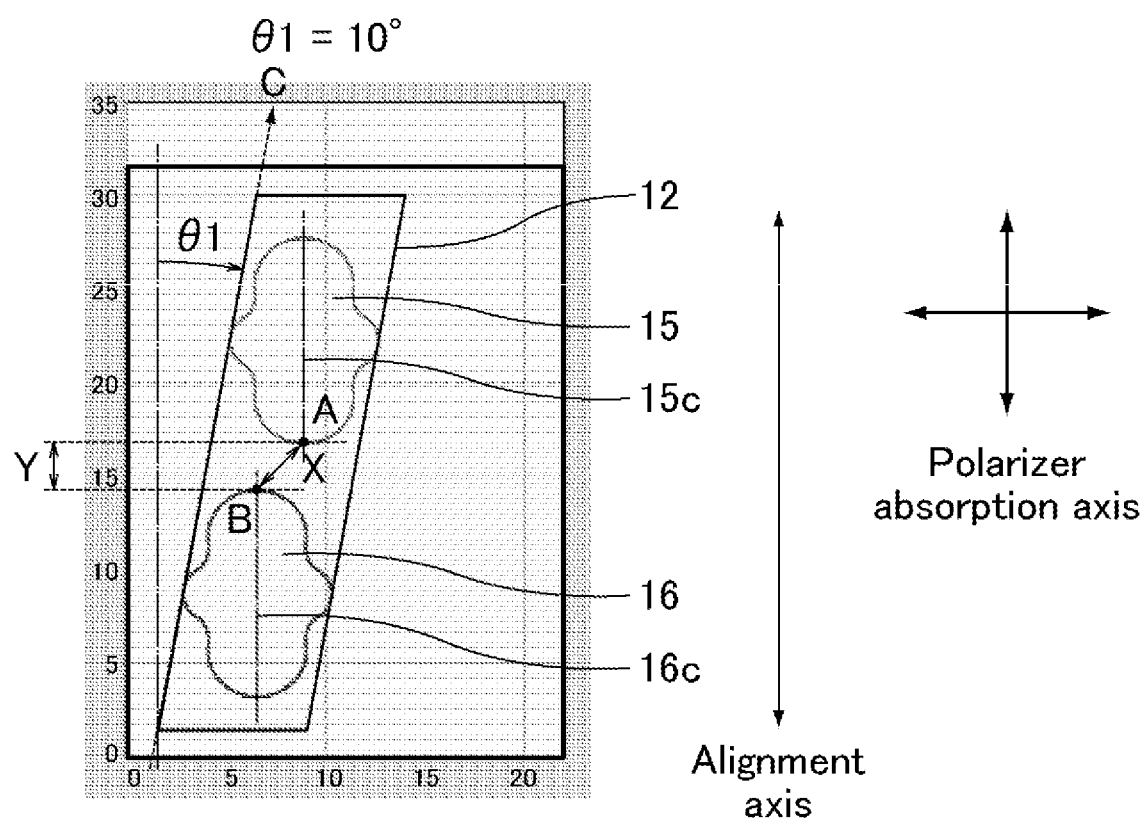
FIG. 24 is a schematic plan view of a display unit in a liquid crystal display device of Example 29.

FIG. 24 is a schematic plan view of a display unit in a liquid crystal display device of Example 29. A liquid crystal display device of Example 29 has the same structure as the liquid crystal display device of Example 1, except that the angle θ1 was changed to 10°.

EXAMPLE 30 to EXAMPLE 32

Liquid crystal display devices of Examples 30 to 32 each have the same structure as the liquid crystal display device of Example 29, except that the distance Y was changed to 1.5 μm, 2.5 μm, and 4.5 μm, respectively.

The liquid crystal display devices of Examples 29 to 32 were subjected to simulations at applied voltages of 5.0 V and 6.0 V and evaluated in the same manner as in Example 1. FIG. 25 is a table showing the simulation results of Examples 29 to 32.

EXAMPLE 33

Figure 26:
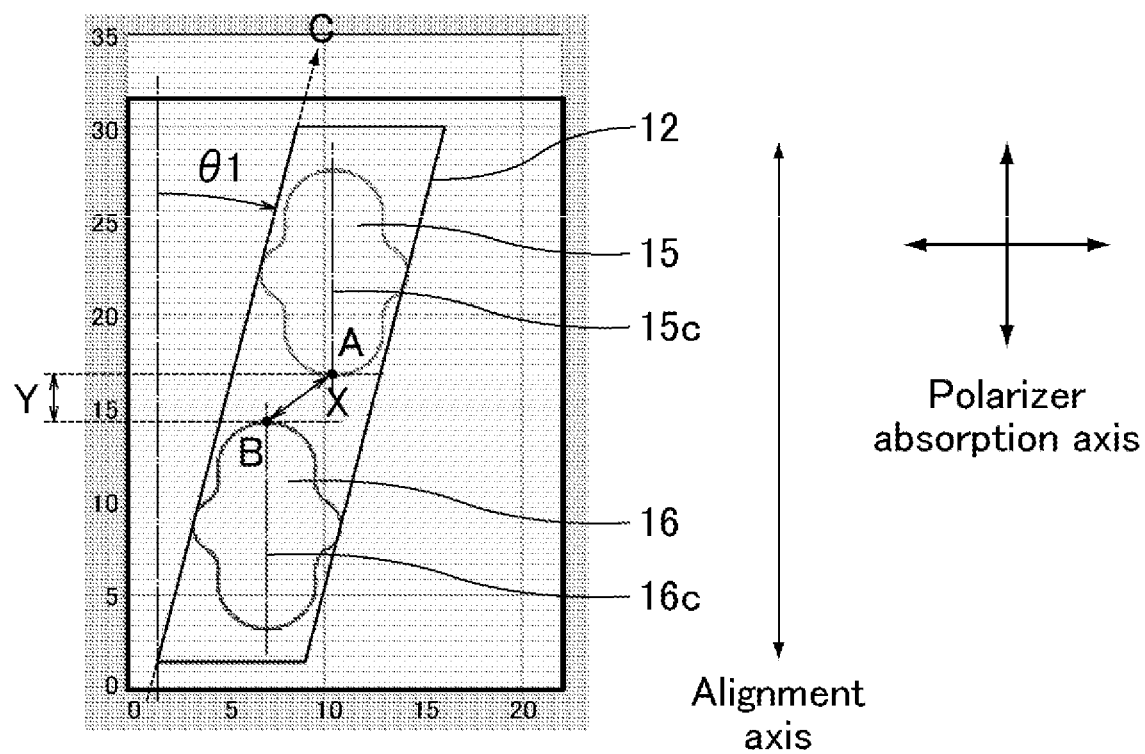
FIG. 26 is a schematic plan view of a display unit in a liquid crystal display device of Example 33.

FIG. 26 is a schematic plan view of a display unit in a liquid crystal display device of Example 33. A liquid crystal display device of Example 33 has the same structure as the liquid crystal display device of Example 1, except that the angle θ1 was changed to 14°.

EXAMPLE 34 to EXAMPLE 36

Liquid crystal display devices of Examples 34 to 36 each have the same structure as the liquid crystal display device of Example 33, except that the distance Y was changed to 1.5 μm, 2.5 μm, and 4.5 μm, respectively.

Figure 27:
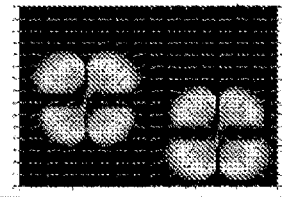
FIG. 27 is a table showing the simulation results of Examples 33 to 36.
Figure 27:
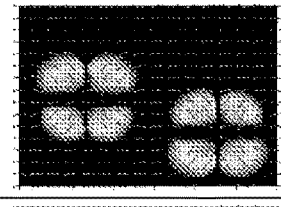
Figure 27:
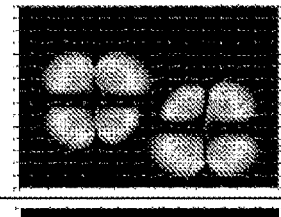
Figure 27:
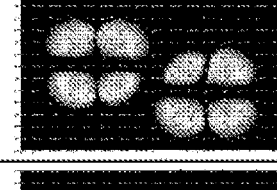

The liquid crystal display devices of Examples 33 to 36 were subjected to simulations at applied voltages of 5.0 V and 6.0 V and evaluated in the same manner as in Example 1. FIG. 27 is a table showing the simulation results of Examples 33 to 36.

EXAMPLE 37

Figure 28:
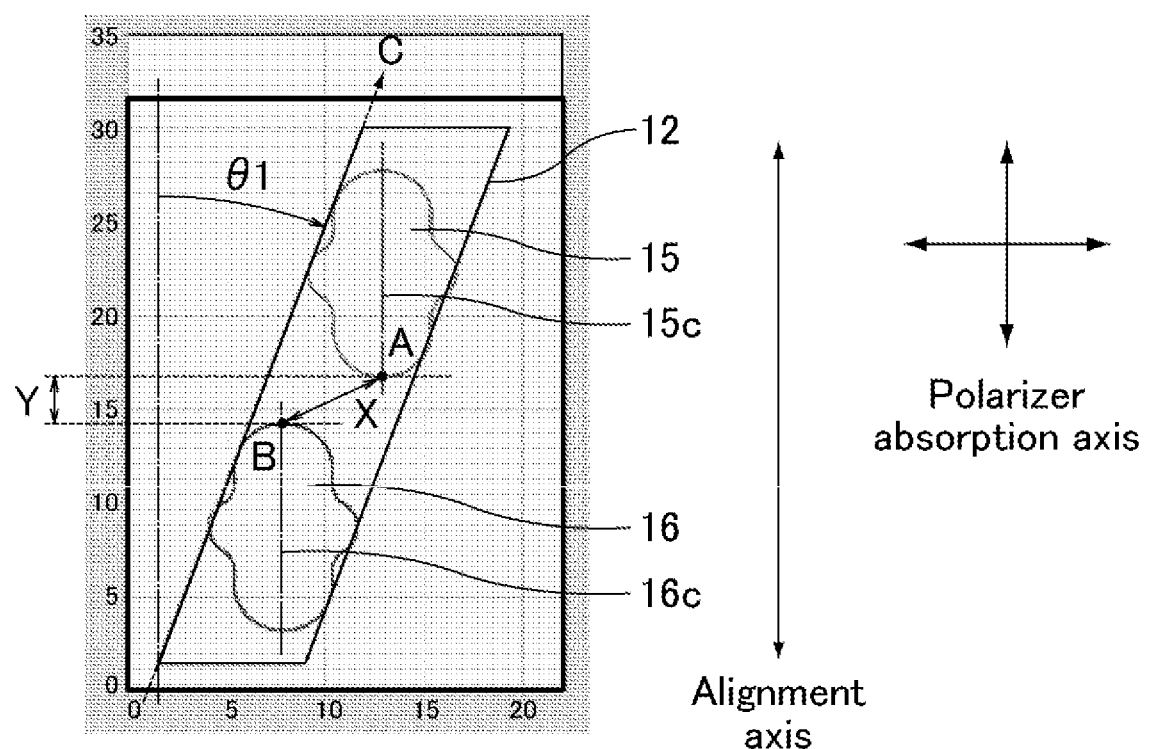
FIG. 28 is a schematic plan view of a display unit in a liquid crystal display device of Example 37.

FIG. 28 is a schematic plan view of a display unit in a liquid crystal display device of Example 37. A liquid crystal display device of Example 37 has the same structure as the liquid crystal display device of Example 1, except that the angle θ1 was changed to 20°.

EXAMPLE 38 to EXAMPLE 40

Liquid crystal display devices of Examples 38 to 40 each have the same structure as the liquid crystal display device of Example 37, except that the distance Y was changed to 1.5 μm, 2.5 μm, and 4.5 μm, respectively.

The liquid crystal display devices of Examples 37 to 40 were subjected to simulations at applied voltages of 5.0 V and 6.0 V and evaluated in the same manner as in Example 1. FIG. 29 is a table showing the simulation results of Examples 37 to 40.

In the following Examples 41 to 50, the angle θ2 was changed in accordance with the angle θ1 so as to make the alignment azimuth (alignment axis) of liquid crystal molecules parallel to the extending direction of the long sides of the pixel electrode.

EXAMPLE 41

A liquid crystal display device of Example 41 has the same structure as the liquid crystal display device of Example 1 with θ1=θ2=0°, except that the distance Y was changed to 2.5 μm.

EXAMPLE 42 to EXAMPLE 50

Liquid crystal display devices of Examples 42 to 50 each have the same structure as the liquid crystal display device of Example 41, except that the angle θ1 and the angle θ2 were changed to 2°, 4°, 5°, 6°, 7°, 8°, 10°, 14°, and 20°, with the angle θ1=the angle θ2.

Figure 31:
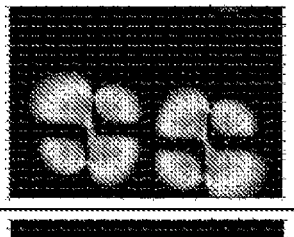
FIG. 31 is a table showing the simulation results of Examples 44 to 46.
Figure 31:
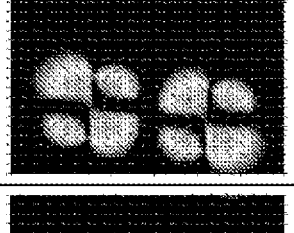
Figure 31:
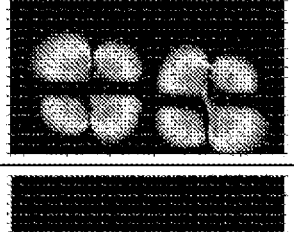
Figure 32:
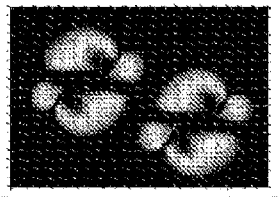
FIG. 32 is a table showing the simulation results of Examples 47 to 50.
Figure 32:
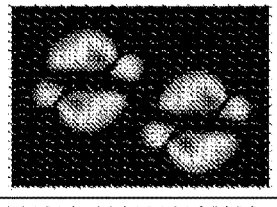
Figure 32:
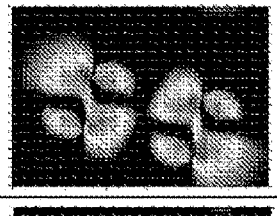
Figure 32:
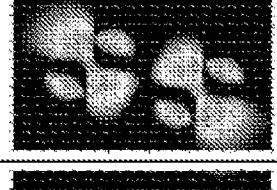

The liquid crystal display devices of Examples 41 to 50 were subjected to simulations at applied voltages of 5.0 V and 6.0 V and evaluated in the same manner as in Example 1. FIG. 30 is a table showing the simulation results of Examples 41 to 43. FIG. 31 is a table showing the simulation results of Examples 44 to 46. FIG. 32 is a table showing the simulation results of Examples 47 to 50.

Each of the examples provided a liquid crystal display device in which four alignment regions in positions rotationally symmetrical to each other were formed for each of the first opening 15 and the second opening 16 in the voltage-applied state. This demonstrates that the presence of the first opening 15 and the second opening 16 in high-definition pixels enables control of the alignment of liquid crystal molecules, providing a liquid crystal display device that achieves both a high transmittance and a high response speed of liquid crystal molecules.

The present inventors have focused on the fact that luminance unevenness may be observed in the display screen of a liquid crystal display device when the distance Y, the angle θ1, and the θ2 are changed. The present inventors performed studies on occurrence of luminance unevenness, and found that luminance unevenness occurs due to the presence of the first opening 15 and the second opening 16 adjacent to each other in the counter electrode 14. In this case, liquid crystal molecules conflict with each other at the boundary of adjacent alignment regions between the first opening 15 and the second opening 16, and the alignments of liquid crystal molecules become uneven and the transmittance was changed. Thereby, luminance unevenness occurs.

In production of the first opening 15 and the second opening 16 in the counter electrode 14, an error of about ±1 μm, may occur in parameters such as the distance between the first opening 15 and the second opening 16 and the peripheral shapes. In order to examine the influence of such an error in the production, the distance Y, the angle θ1, and the angle θ2 were changed and transmittance variation in one display unit was observed.

Figure 33:
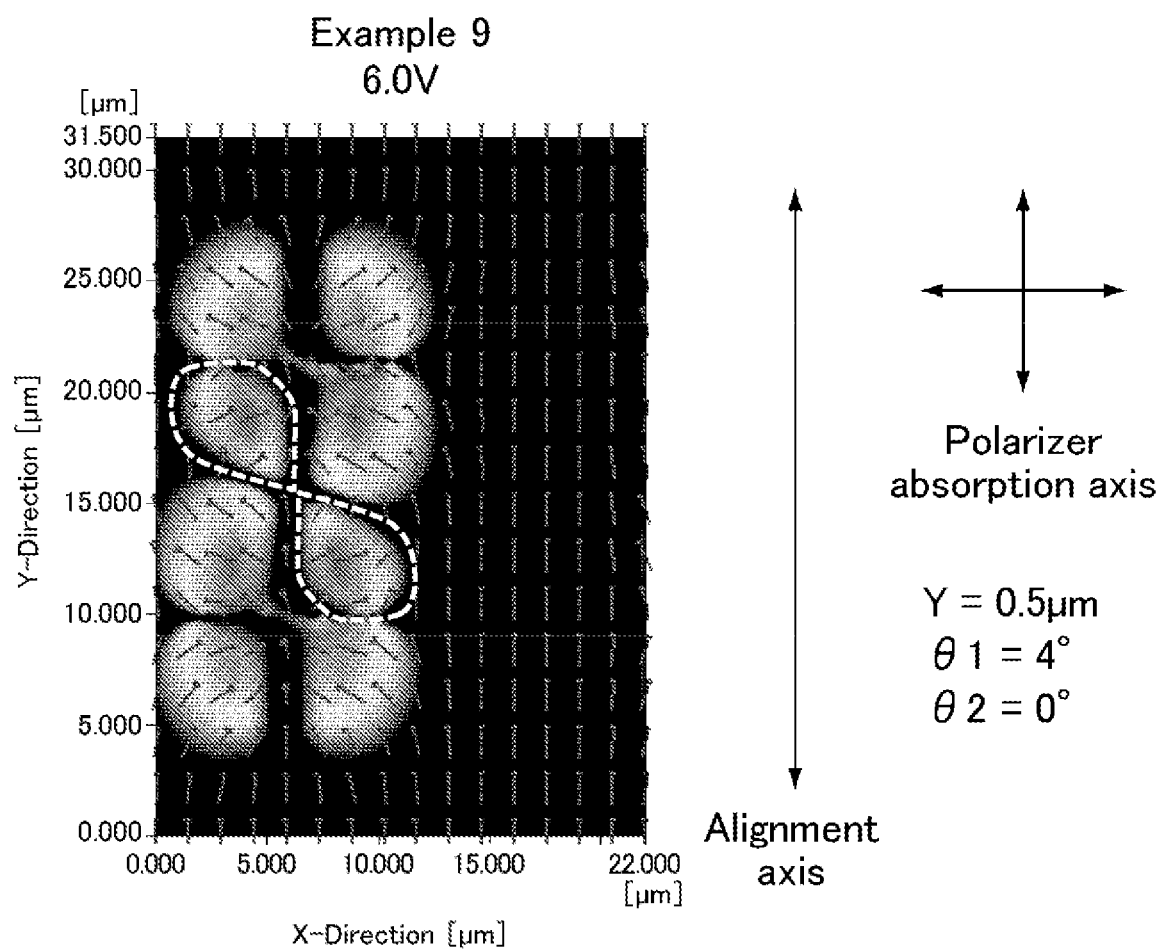
FIG. 33 is a plan view showing the simulation results of Example 9.
Figure 34:
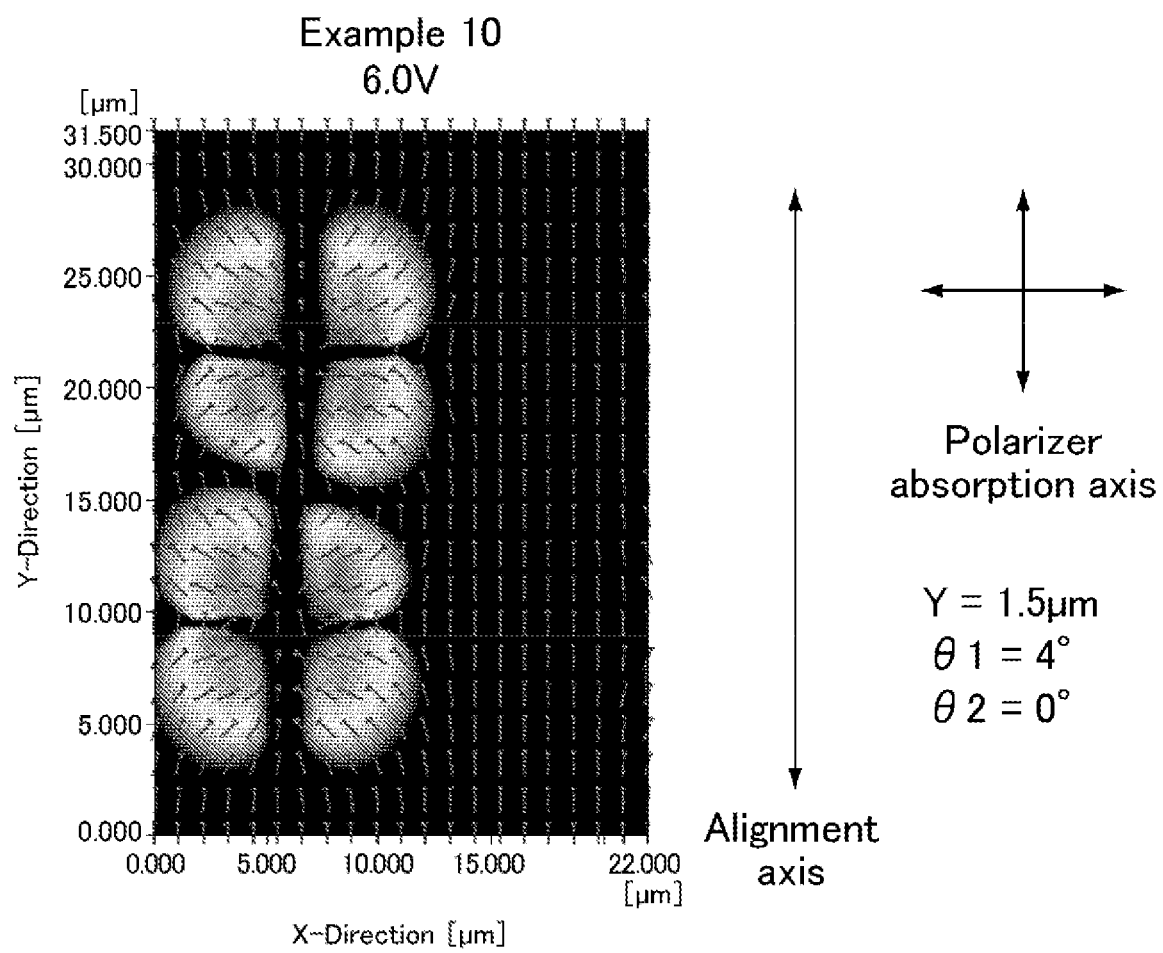
FIG. 34 is a plan view showing the simulation results of Example 10.
Figure 35:
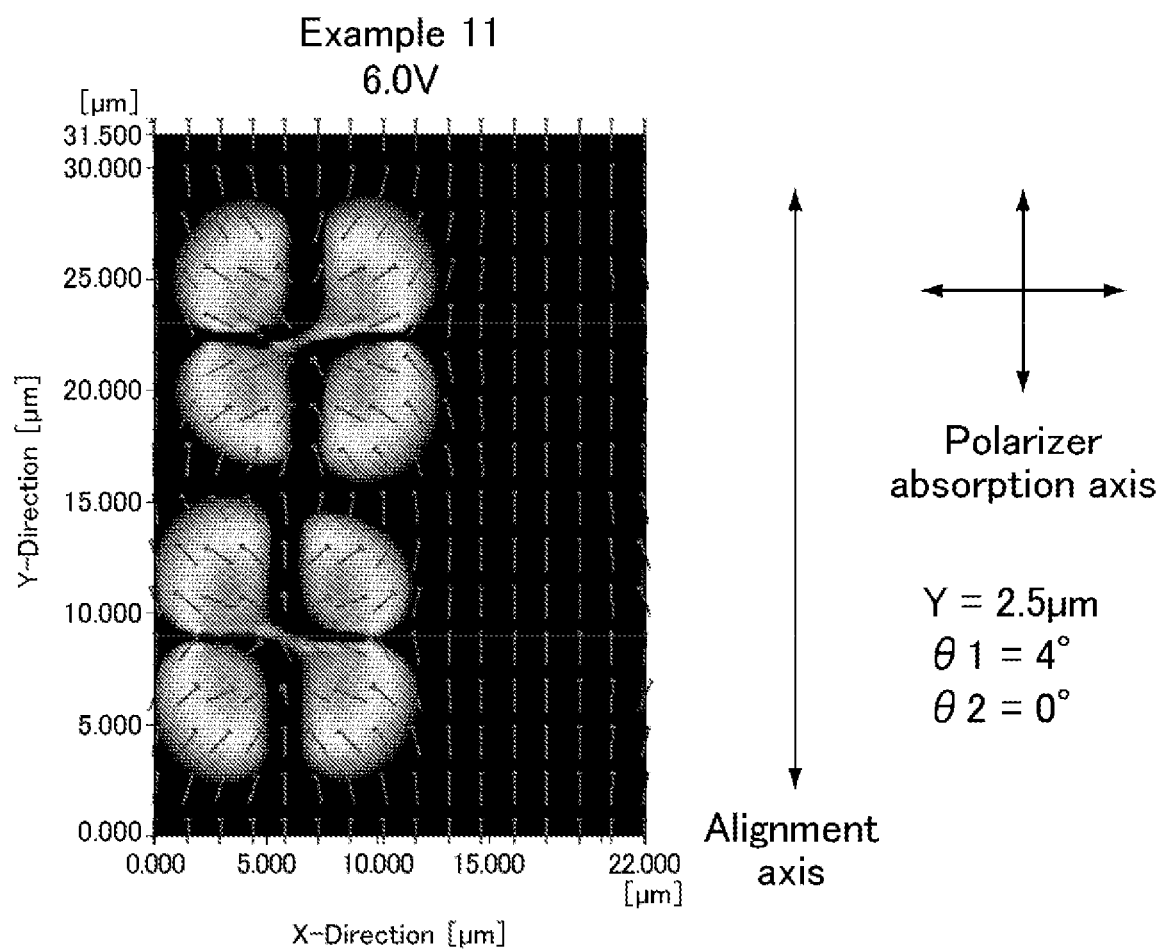
FIG. 35 is a plan view showing the simulation results of Example 11.
Figure 36:
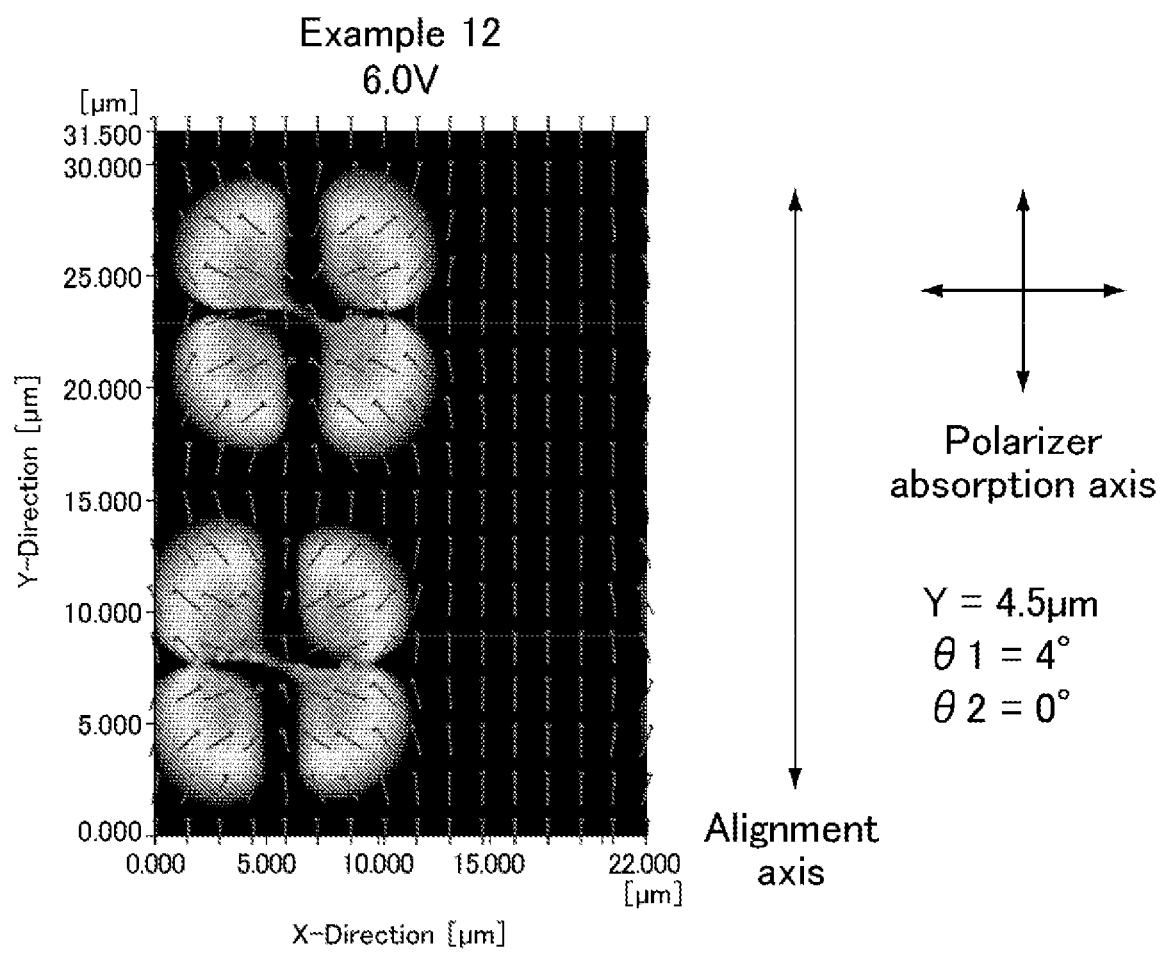
FIG. 36 is a plan view showing the simulation results of Example 12.

At first, changes of the transmittance in accordance with changes of the distance Y were examined. With reference to FIG. 33 to FIG. 36, Examples 9 to 12 are taken as examples in which the angle θ1 was set to 4°, the angle θ2 was set to 0°, and the distance Y was changed. FIG. 33 is a plan view showing the simulation results of Example 9. FIG. 34 is a plan view showing the simulation results of Example 10. FIG. 35 is a plan view showing the simulation results of Example 11. FIG. 36 is a plan view showing the simulation results of Example 12.

Comparison of FIG. 33 to FIG. 36 shows that the narrower the distance Y is, the more the alignment regions adjacent to each other between the first opening 15 and the second opening 16 among the four alignment regions formed for each opening are affected by each other. In Example 9 (FIG. 33) where the first opening 15 and the second opening 16 are too close to each other, the alignment regions adjacent to each other between the openings were slightly oblique as surrounded by the dotted line. Thus, the transmittance in Example 9 was low and the gray scale value fell within the range of 1 to 2 at which luminance unevenness is likely to be observed. FIG. 33 to FIG. 36 also show that the wider the distance Y is, the less the alignment regions adjacent to each other between the openings are affected by each other, and thus the higher the transmittance is. In contrast, in Example 12 (FIG. 36), no influence was exerted on the alignments of liquid crystal molecules between the first opening 15 and the second opening 16. Thus, the transmittance is too high. Accordingly, on the basis of Example 2 (Y=1.5 μ, θ1=0°, θ2=0°, 6.0 V applied), the transmittance difference exceeded 1.5% and thus luminance unevenness was observed.

Figure 37:
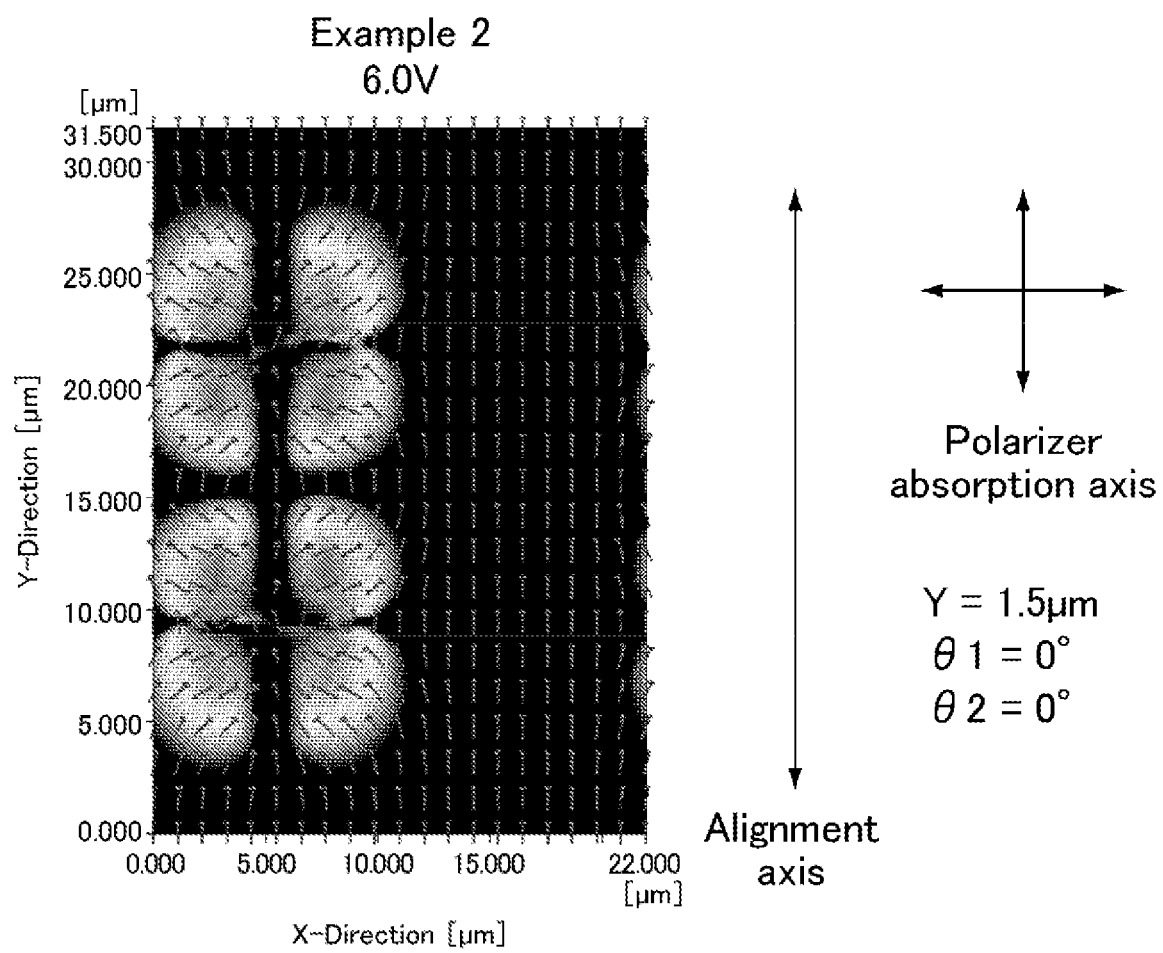
FIG. 37 is a plan view showing the simulation results of Example 2.
Figure 38:
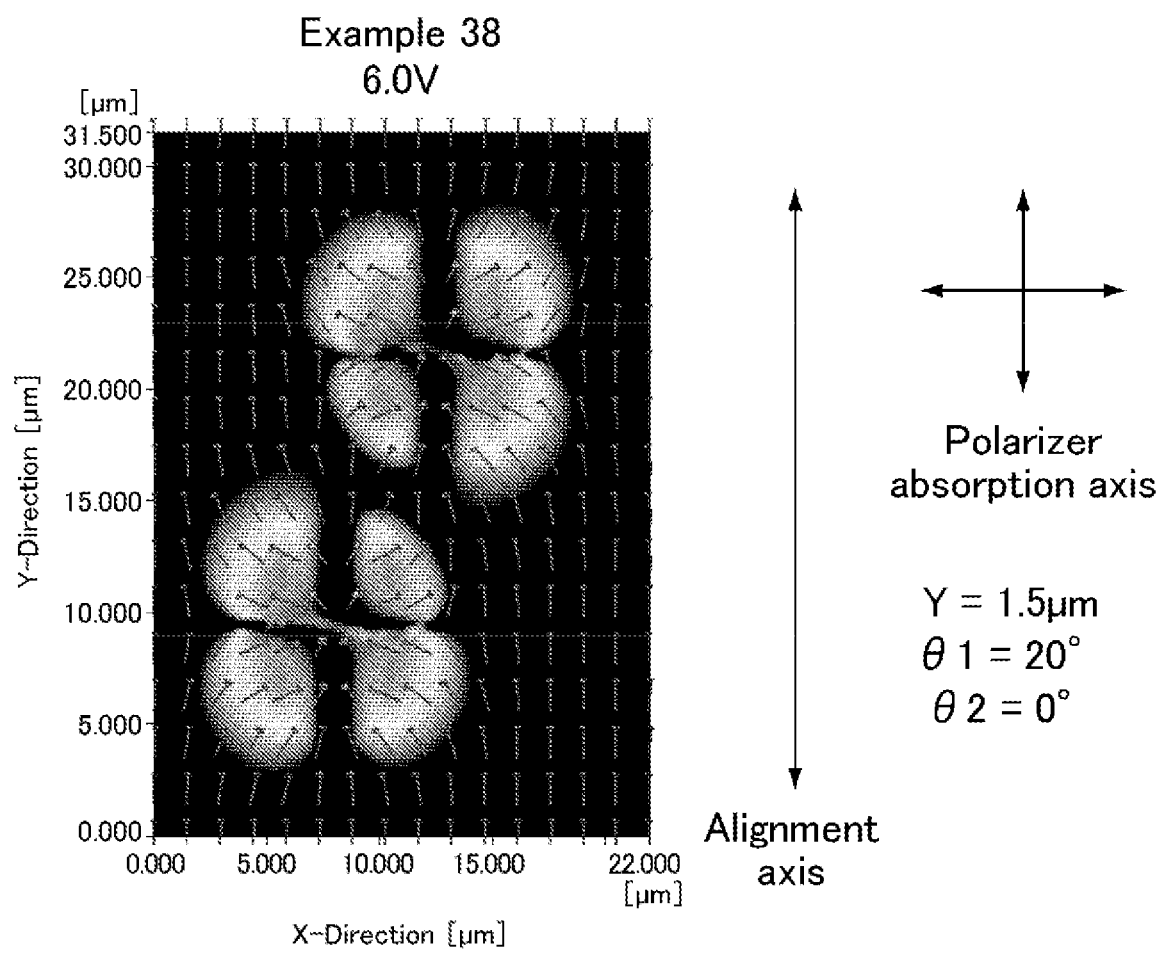
FIG. 38 is a plan view showing the simulation results of Example 38.
Figure 39:
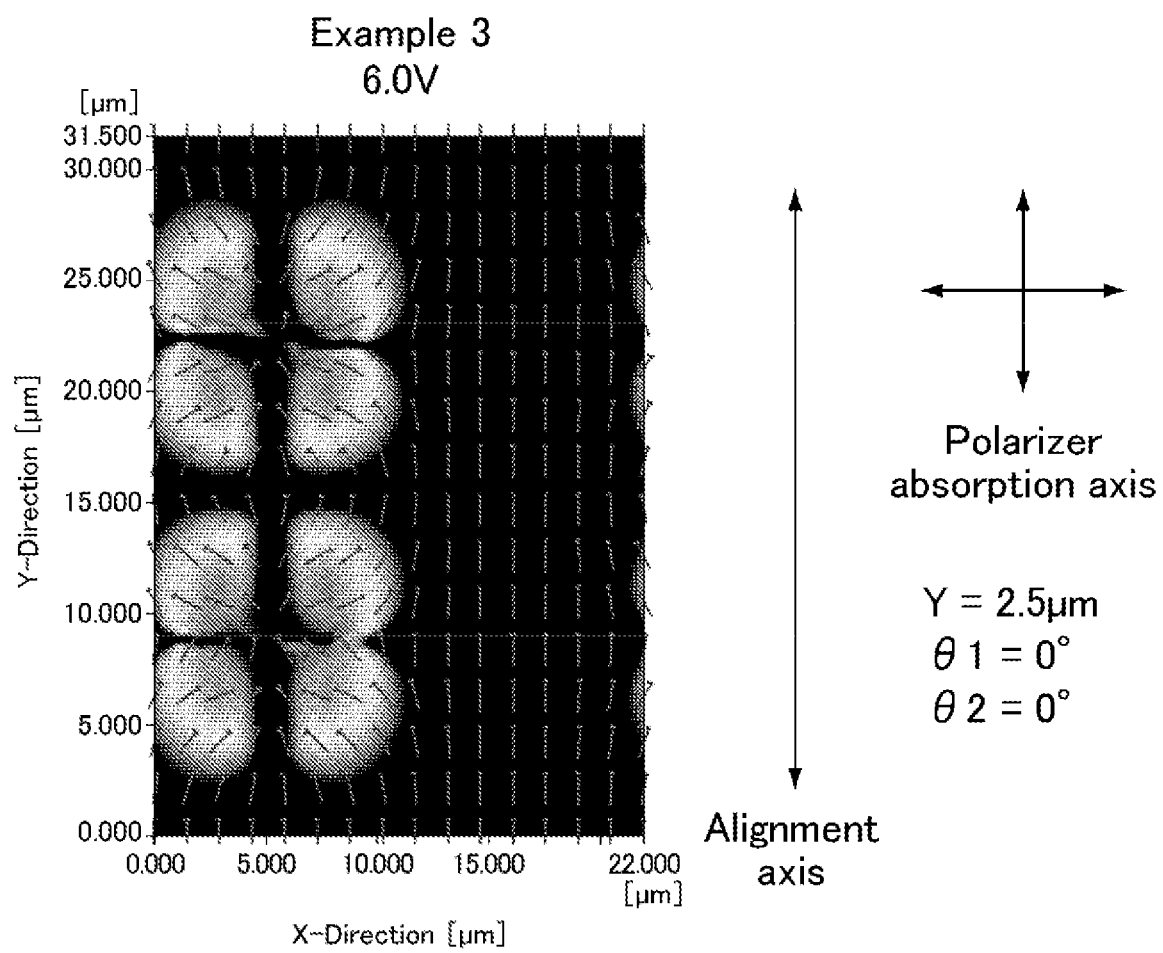
FIG. 39 is a plan view showing the simulation results of Example 3.
Figure 40:
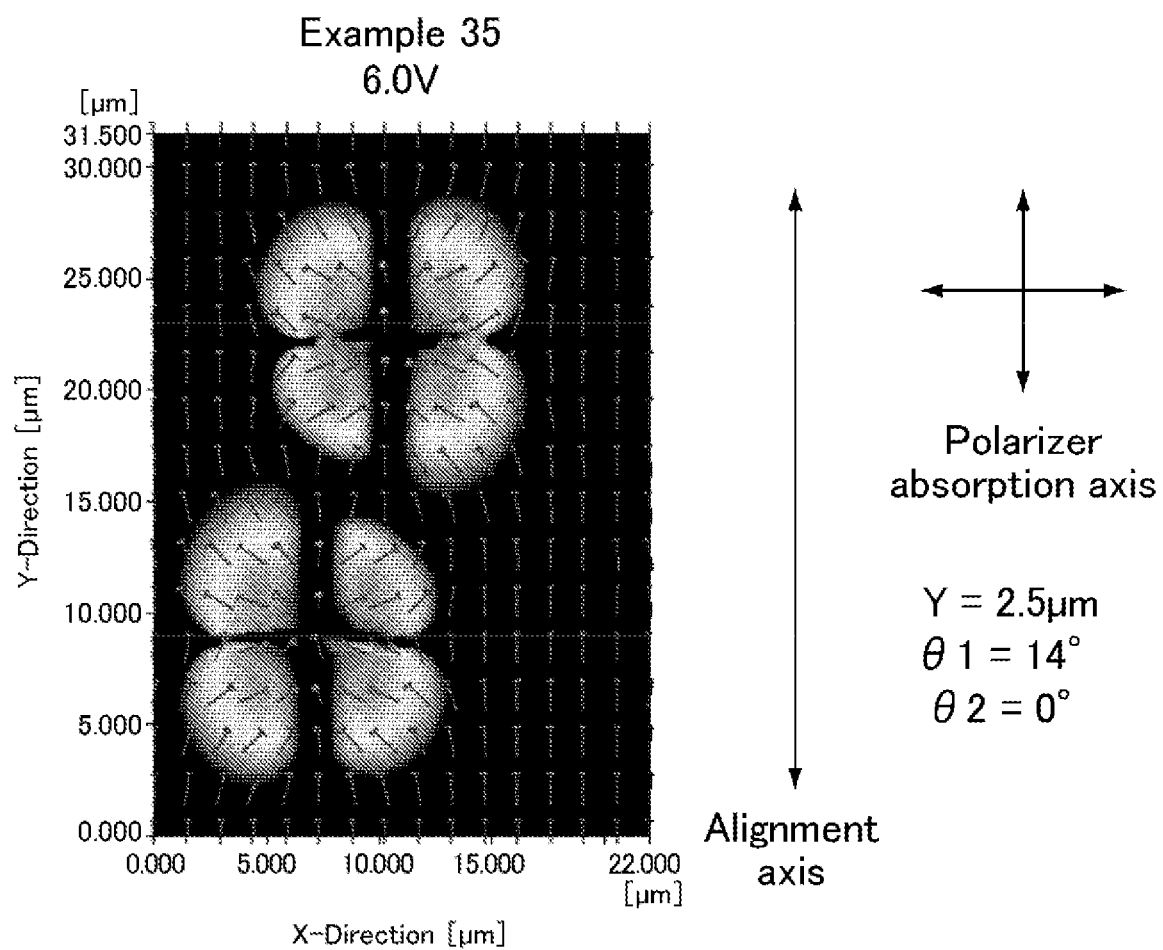
FIG. 40 is a plan view showing the simulation results of Example 35.
Figure 41:
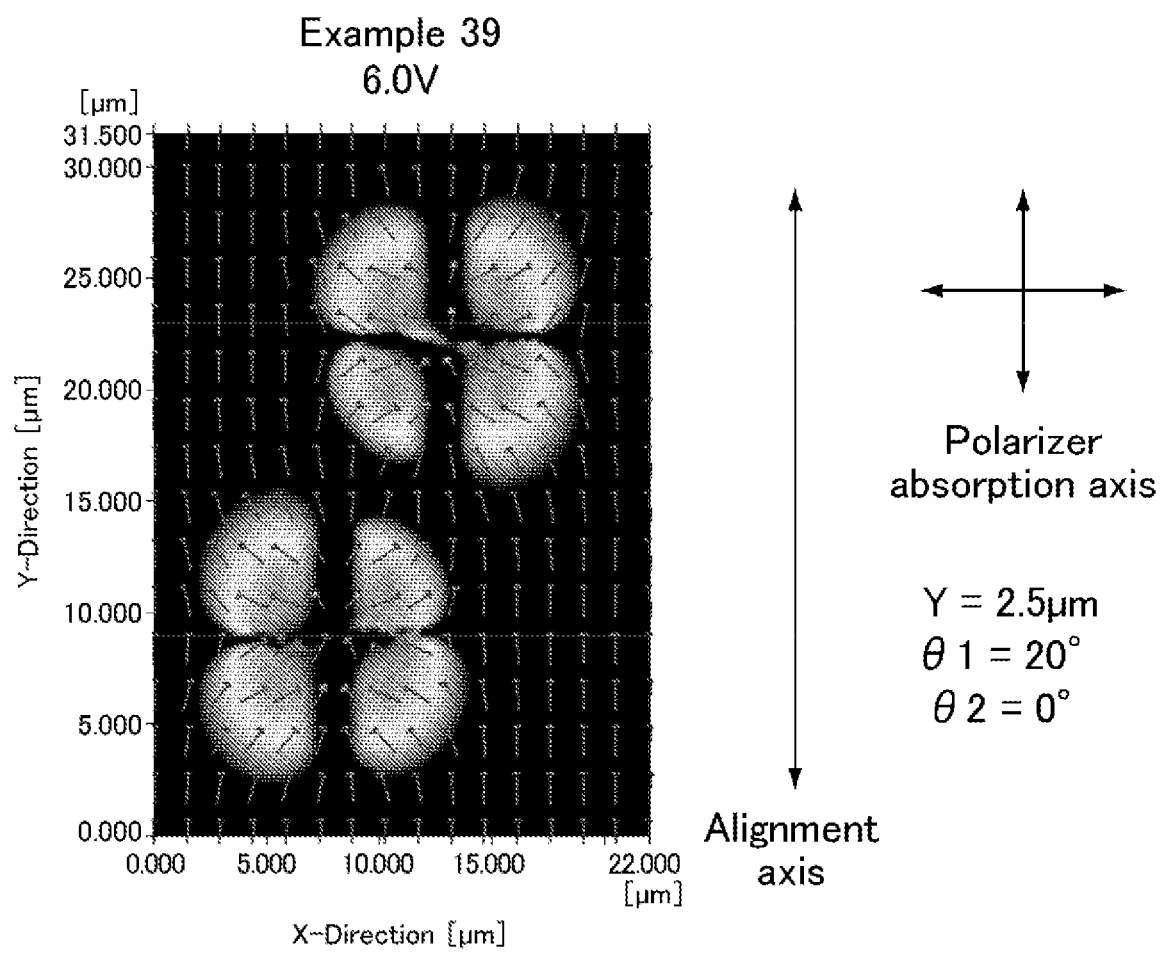
FIG. 41 is a plan view showing the simulation results of Example 39.
Figure 42:
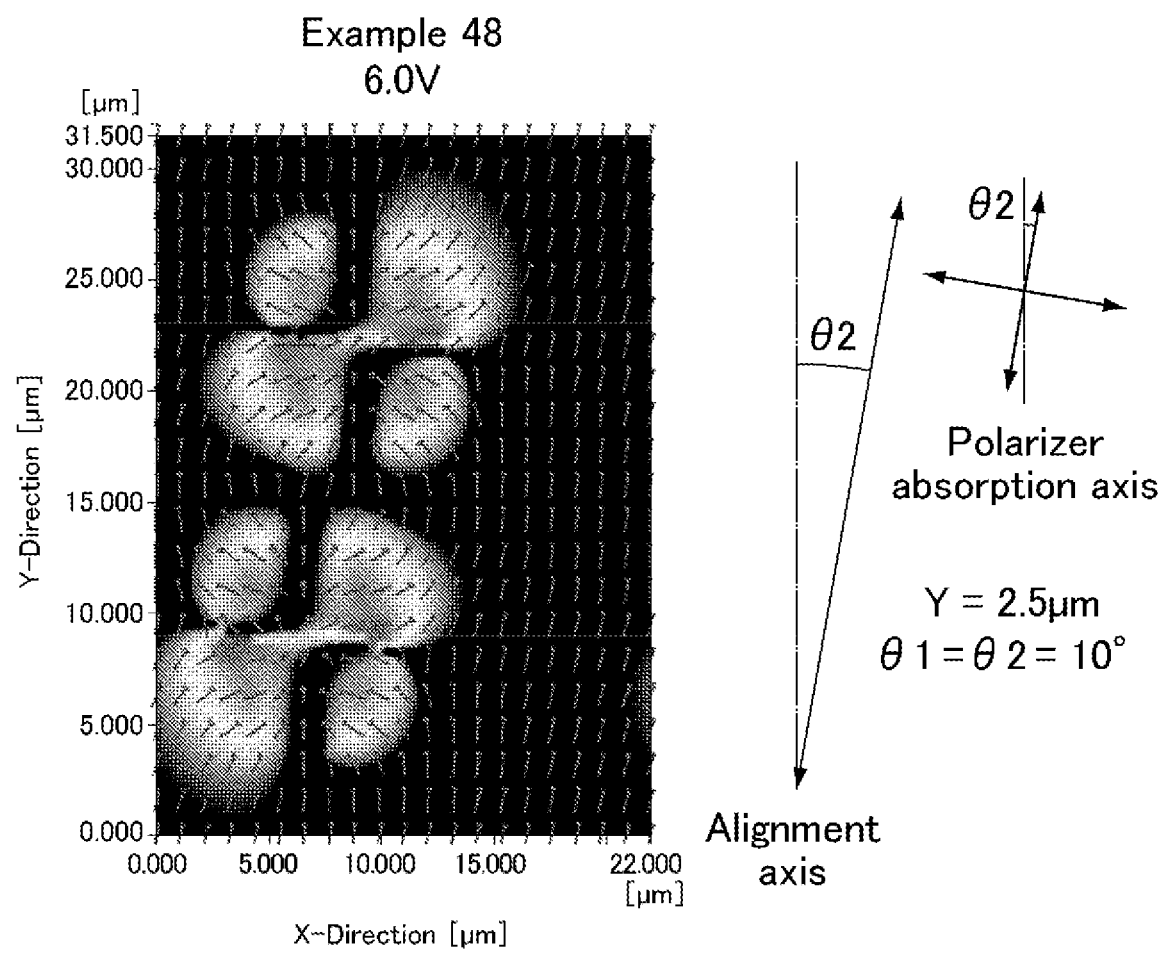
FIG. 42 is a plan view showing the simulation results of Example 48.
Figure 43:
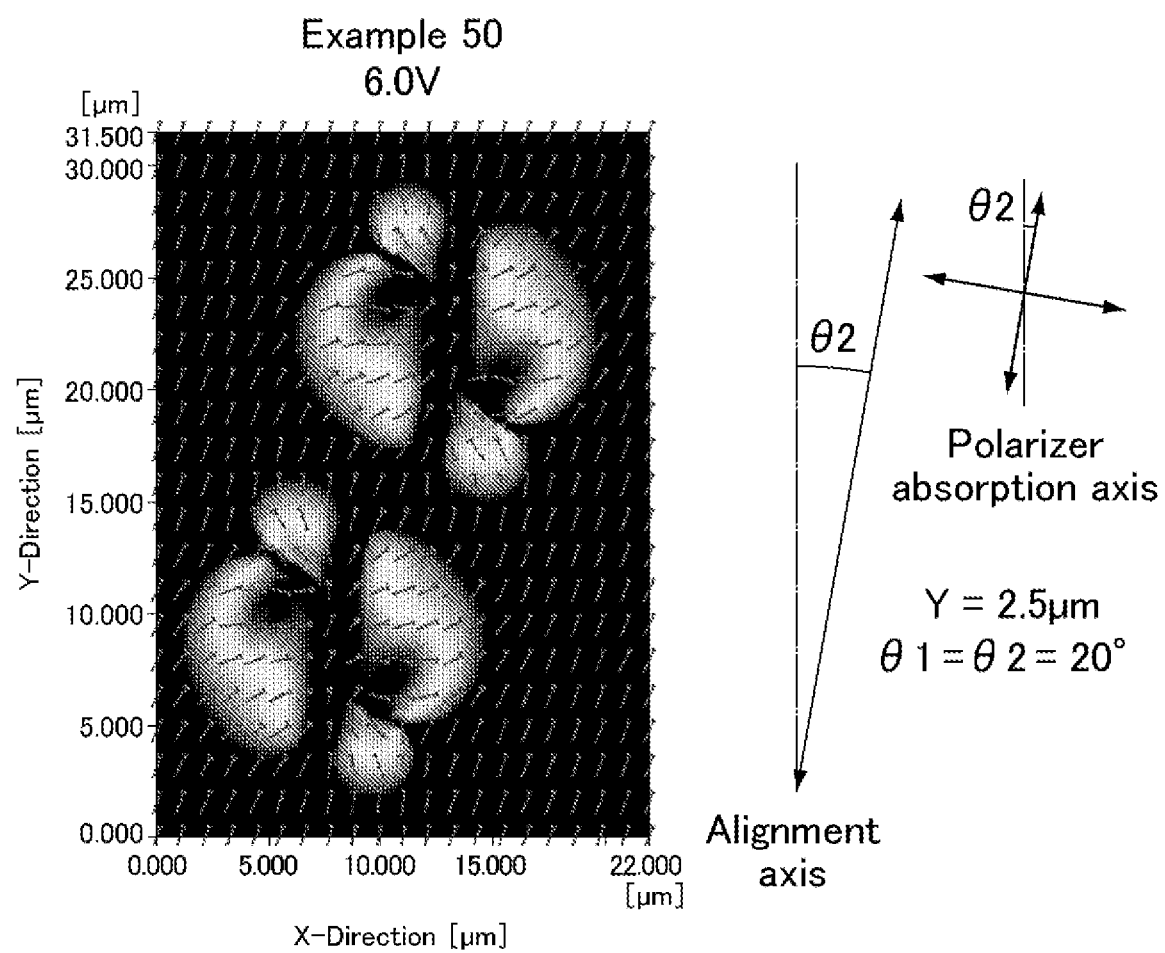
FIG. 43 is a plan view showing the simulation results of Example 50.

Next, changes of the transmittance in accordance with changes of the angle θ1 were examined. With reference to FIG. 37 to FIG. 43, the examples in which the angle θ2 was set to 0°, the distance Y was set to 1.5 μm, or 2.5 μm, and the angle θ1 was changed are taken as examples. FIG. 37 is a plan view showing the simulation results of Example 2. FIG. 38 is a plan view showing the simulation results of Example 38. FIG. 39 is a plan view showing the simulation results of Example 3. FIG. 40 is a plan view showing the simulation results of Example 35. FIG. 41 is a plan view showing the simulation results of Example 39. FIG. 42 is a plan view showing the simulation results of Example 48. FIG. 43 is a plan view showing the simulation results of Example 50.

Comparison between Example 2 (FIG. 37) and Example 38 (FIG. 38) shows that, with the distance Y=1.5 μm, and the angle θ2=0°, smaller proportions of the alignment regions adjacent to each other between the openings are affected by each other, and thus the transmittance is less changed even when the angle θ1 is changed. This is presumably because as follows. That is, the above distance Y is appropriate to the alignment regions adjacent to each other between the openings and, even when the angle θ1 was changed, the conflict between the liquid crystal molecules exerts a balanced influence on the alignment regions adjacent to each other between the openings, so that the transmittance is less likely to change.

Comparison of Example 3 (FIG. 39), Example 35 (FIG. 40), and Example 39 (FIG. 41) shows that, with the distance Y=2.5 μm, and the angle θ2=0°, which means the alignment regions adjacent to each other between the openings are apart from each other, the transmittance is excessively reduced as the angle θ1 is changed; specifically, the transmittance is 1.5% or more lower than that of Example 2 (Y=1.5 μ, θ1=0°, θ2=0°, 6.0 V applied).

Comparison of Example 3 (FIG. 39), Example 48 (FIG. 42), and Example 50 (FIG. 43) shows as follows. That is, with the distance Y=2.5 μm, a change of the angle θ1 from 0° to 10° or 20° and the corresponding change of the angle θ2 from 0° to 10° or 20° so as to achieve θ1=θ2 disturb the balance of the alignments of liquid crystal molecules among the four alignment regions formed for each of the first opening 15 and the second opening 16, and further greatly change the balance between the alignment regions adjacent to each other between the openings. This means the transmittance will be greatly changed when the bisectors 15c and 16c in the lateral direction of the first opening 15 and the second opening 16 and the alignment azimuths (polarization axes) of liquid crystal molecules are misaligned.

Figure 44:
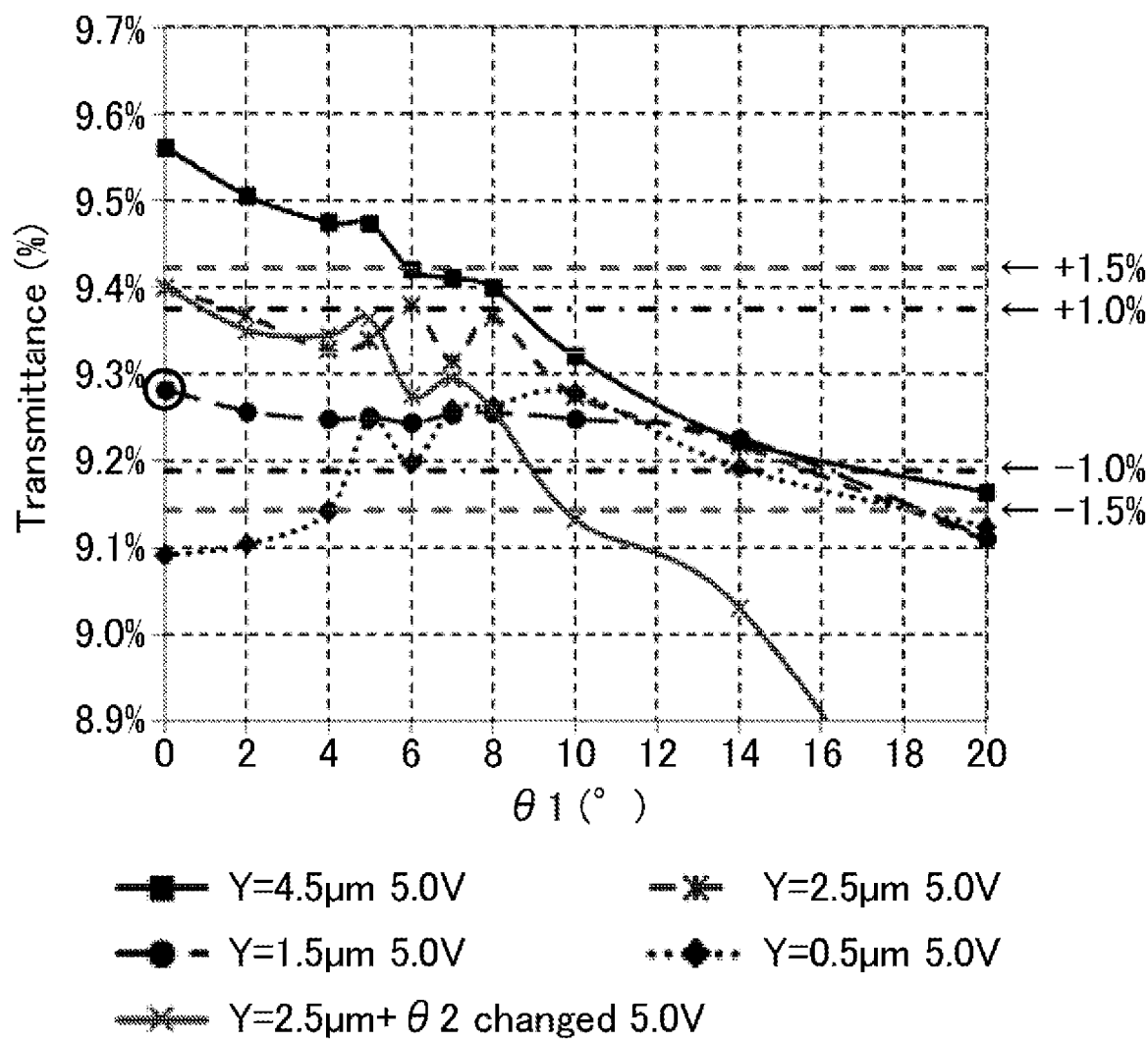
FIG. 44 is a graph showing the relationship between the angle $\theta 1$ and the transmittance at an applied voltage of 5.0 V.
Figure 45:
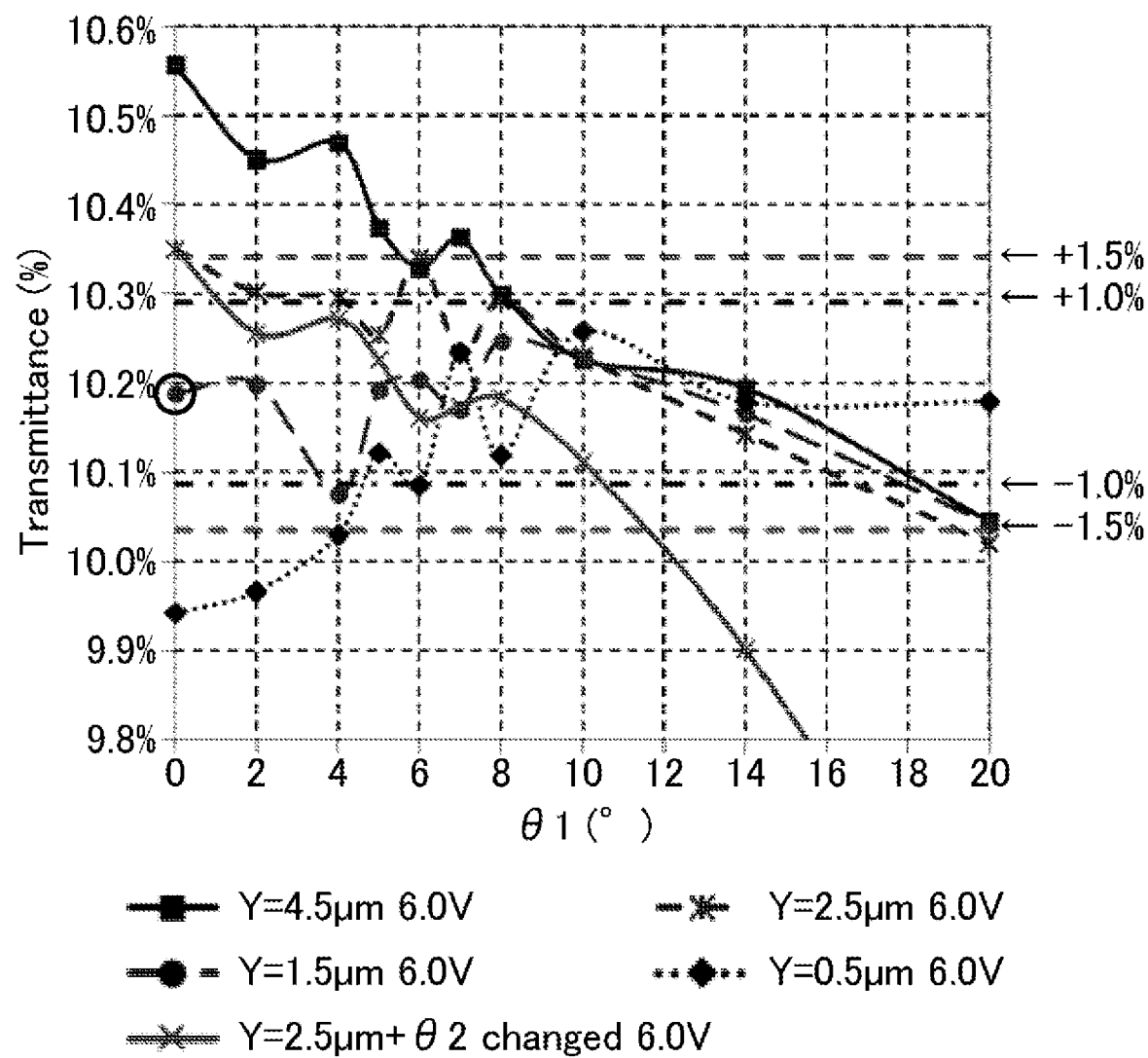
FIG. 45 is a graph showing the relationship between the angle $\theta 1$ and the transmittance at an applied voltage of 6.0 V.

Further, the transmittance performance in accordance with changes in the angle θ1 at an applied voltage of 5.0 V and 6.0 V was examined. FIG. 44 is a graph showing the relationship between the angle θ1 and the transmittance at an applied voltage of 5.0 V. FIG. 45 is a graph showing the relationship between the angle θ1 and the transmittance at an applied voltage of 6.0 V. In each graph, the horizontal axis shows the angle θ1) (°) and the vertical axis shows the transmittance (%). The transmittance is a value at a gray scale value of 225 in the liquid crystal display device of each example. In FIG. 44, the transmittance (9.28%) of Example 2 (5.0 V) circled was used as a reference. In FIG. 45, the transmittance (10.19%) of Example 2 (6.0 V) circled was used as a reference. The transmittance variation in each example was examined within the range of ±1.0% and within the range of ±1.5%. In FIG. 44 and FIG. 45, the explanatory note "Y=2.5 μm+θ2 changed" means the distance Y was set to 2.5 μm, and the polarization axis was changed so as to achieve θ1=θ2. This corresponds to Examples 41 to 50. The other explanatory notes correspond to the cases where the angle θ2 was set to 0° and the angle θ1 was changed with the distance Y=0.5 μm, 1.5 μm, 2.5 μm, and 4.5 μm.

Comparison between FIG. 44 and FIG. 45 shows that the transmittance varies widely when the applied voltage is changed from 5.0 V to 6.0 V. This is presumably because as follows. That is, a high applied voltage may cause a great conflict between the alignments of liquid crystal molecules between the first opening 15 and the second opening 16. This conflict may disturb the balance among the four alignment regions formed for each of the first opening 15 and the second opening 16, greatly affecting the transmittance. FIG. 44 and FIG. 45 demonstrate that, in order to reduce transmittance variation in one display unit and to reduce occurrence of display unevenness in the display screen of the liquid crystal display device, the angle θ1 is preferably 18° or smaller.

Figure 46:
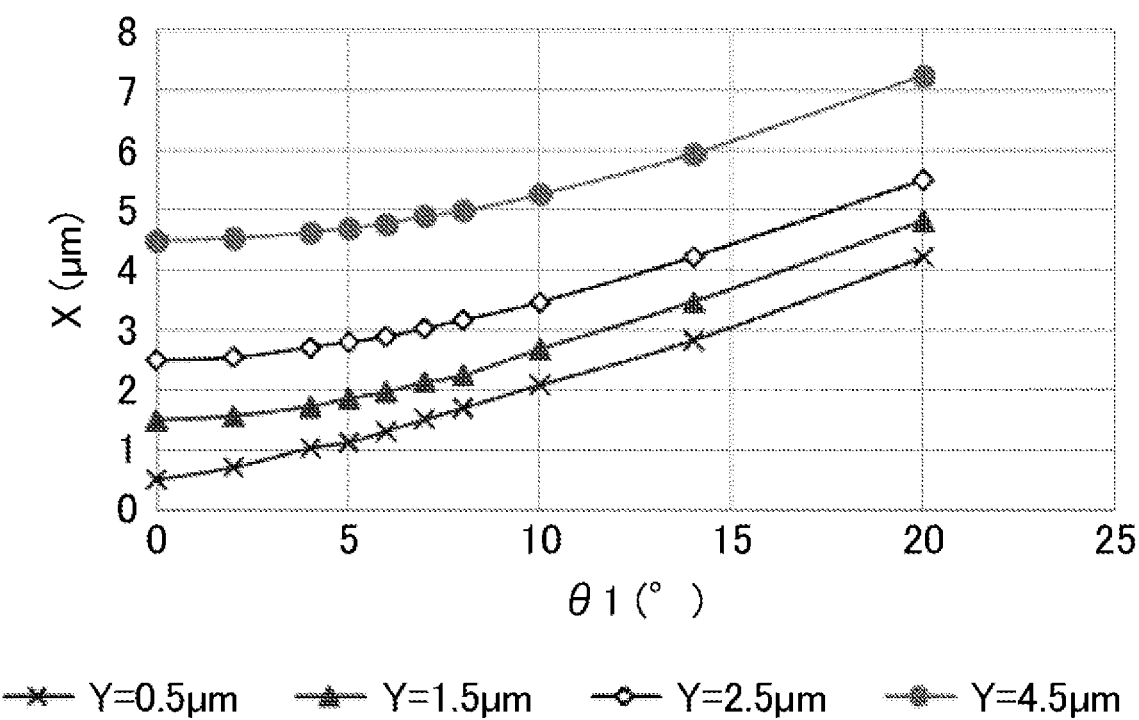
FIG. 46 is a graph showing the relationship between the distance (X) between the vertices of the openings and the angle $\theta 1$.

The relationship between the distance (X) between the vertices of the openings and the angle θ1 is shown in FIG. 46. The distance X is the distance between the vertex A of the curved portion closer to the second opening 16 between the curved portions of the first opening 15 and the vertex B of the curved portion closer to the first opening 15 between the curved portions of the second opening 16. FIG. 46 is a graph showing the relationship between the distance (X)

between the vertices of the openings and the angle θ1. In FIG. 46, the horizontal axis shows the angle θ1 (°) and the vertical axis shows the distance X (μm). FIG. 46 demonstrates that, with a distance Y of any of 0.5 μm, 1.5 μm, 2.5 μm, and 4.5 μm, the distance X correlatively increases as the angle θ1 increases.

Figure 47:
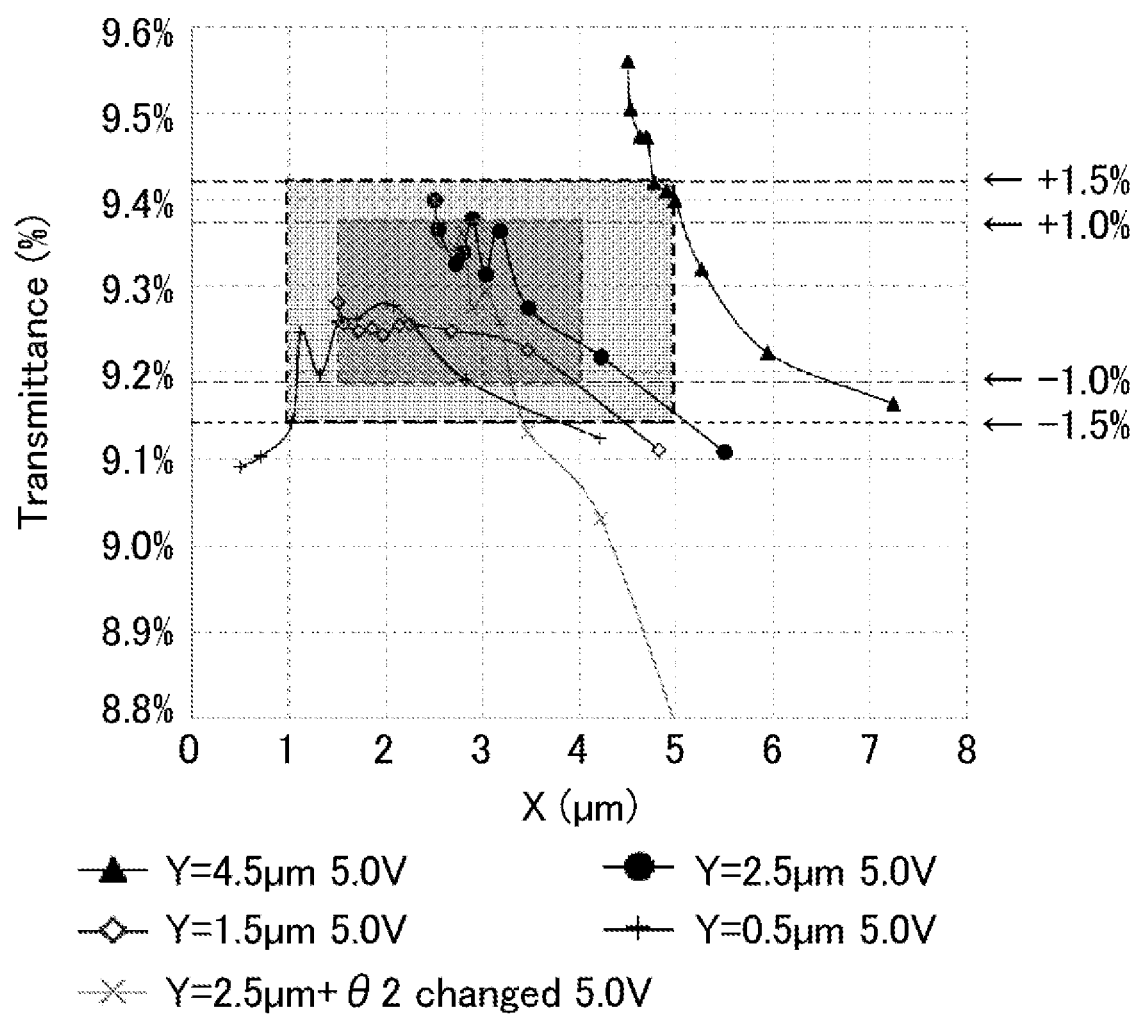
FIG. 47 is a graph showing the relationship between the distance (X) between the vertices of the openings and the transmittance at an applied voltage of 5.0 V.
Figure 48:
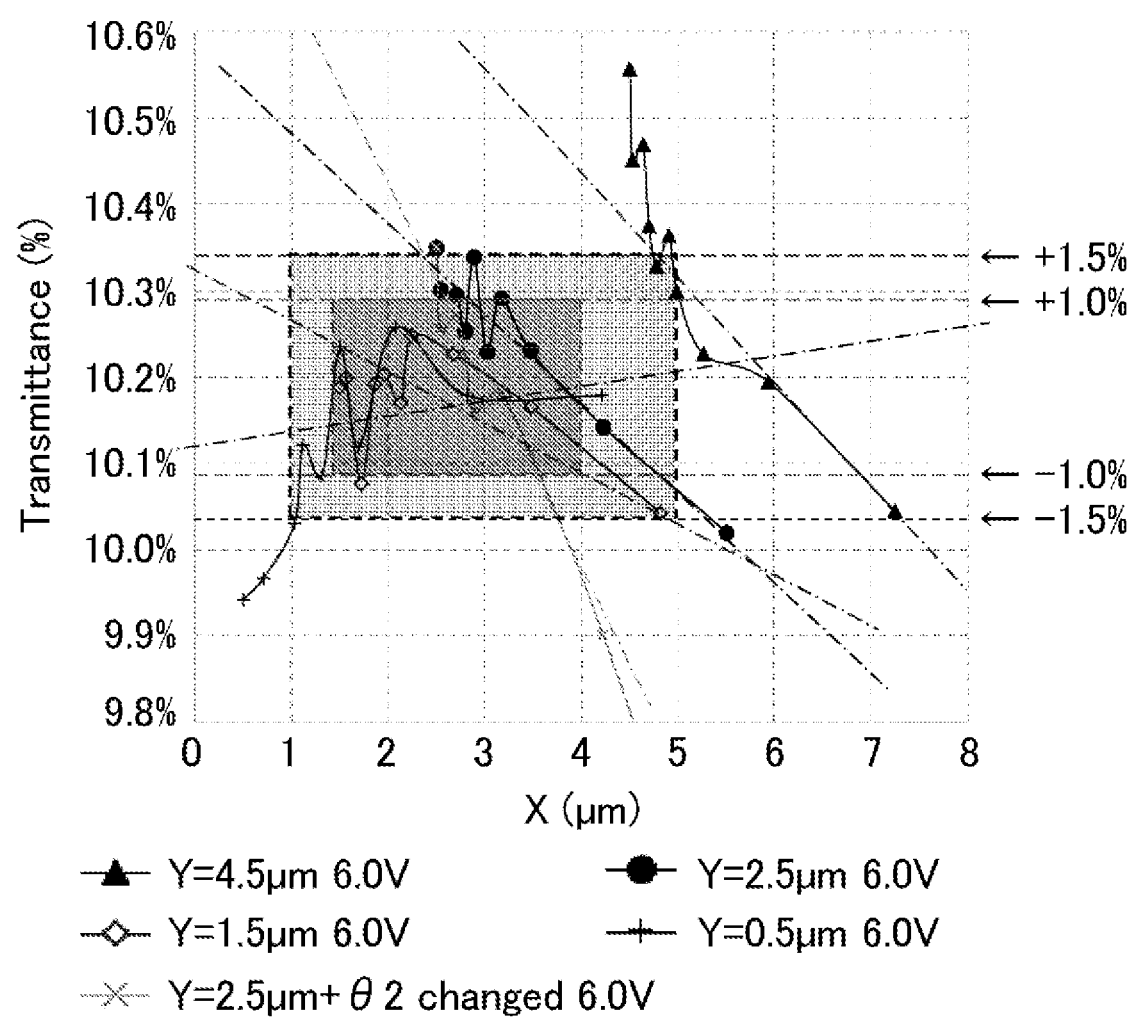
FIG. 48 is a graph showing the relationship between the distance (X) between the vertices of the openings and the transmittance at an applied voltage of 6.0 V.

The relationship between the distance X shown in FIG. 46 and the transmittance of each example is shown in FIG. 47 and FIG. 48. FIG. 47 is a graph showing the relationship between the distance (X) between the vertices of the openings and the transmittance at an applied voltage of 5.0 V. FIG. 48 is a graph showing the relationship between the distance (X) between the vertices of the openings and the transmittance at an applied voltage of 6.0 V. In FIG. 47, the transmittance (9.28%) of Example 2 (5.0 V) was used as a reference. In FIG. 45, the transmittance (10.19%) of Example 2 (6.0 V) was used as a reference. The transmittance variation in each example was examined within the range of ±1.0% and within the range of ±1.5%. FIG. 47 and FIG. 48 demonstrate that the transmittance difference is 1.0% or lower (dark gray area) when the distance X is 1.5 μm, or greater and 4.0 μm, or smaller, and the transmittance difference is 1.5% or lower (light gray area) when the distance X is 1 μm<X≤5 μm. The figures also demonstrate that the slope of the graph increases and the transmittance is more greatly changed as the distance Y is increased from 0.5 μm, to 4.5 μm. The figures also demonstrate that the slope of the graph increases and the transmittance is more greatly changed also when the angle θ1 is increased and the angle θ2 (alignment axis) is changed so as to be parallel to the angle θ1. Accordingly, in order to reduce transmittance variation in one display unit and to reduce occurrence of display unevenness in the display screen of the liquid crystal display device, the distance X is preferably 1 μm<X≤5 μm. The distance X is more preferably 1.5 μm, or greater and 4.0 μm, or smaller.

Figure 49:
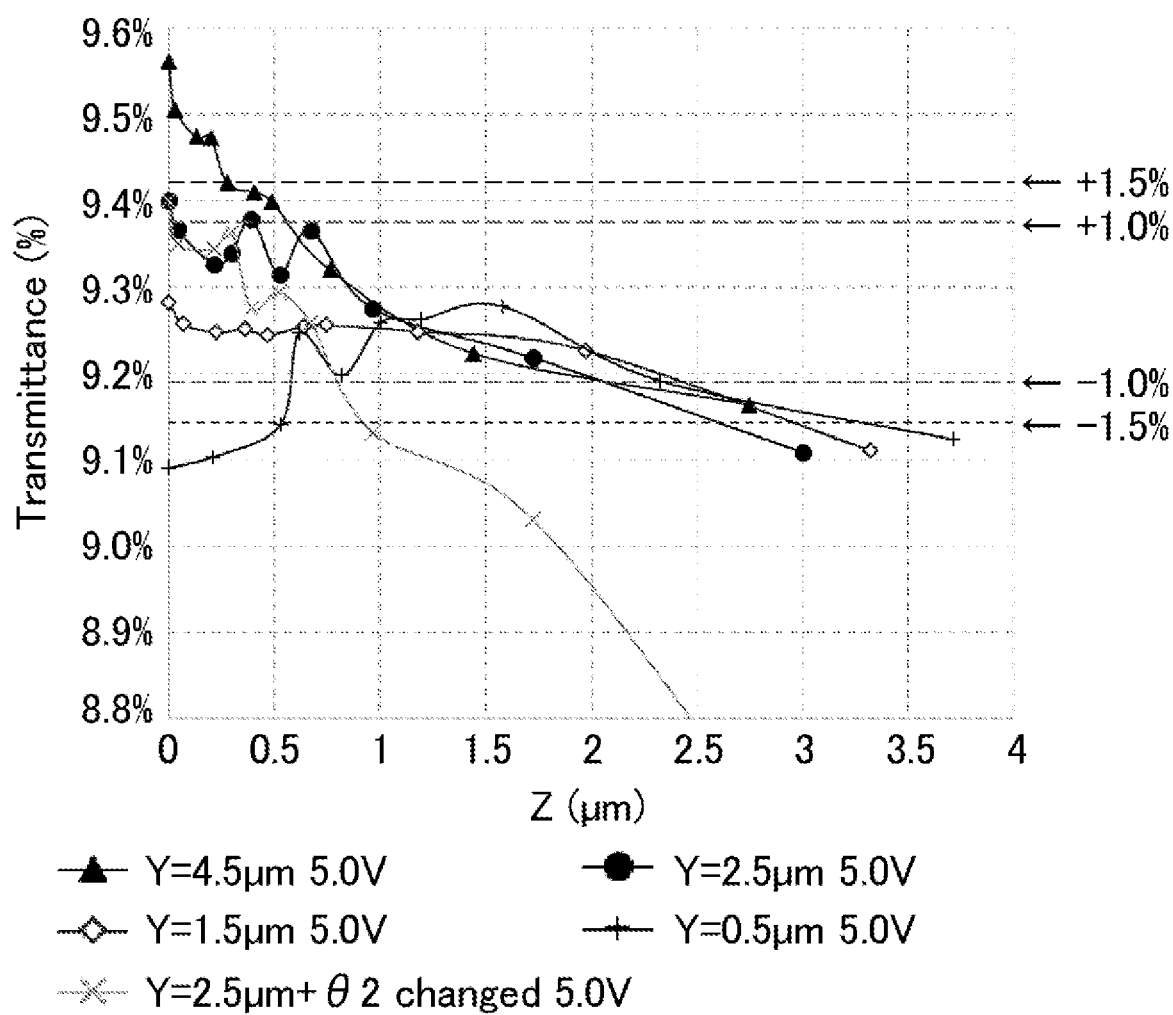
FIG. 49 is a graph showing the relationship between the value Z and the transmittance at an applied voltage of 5.0 V.
Figure 50:
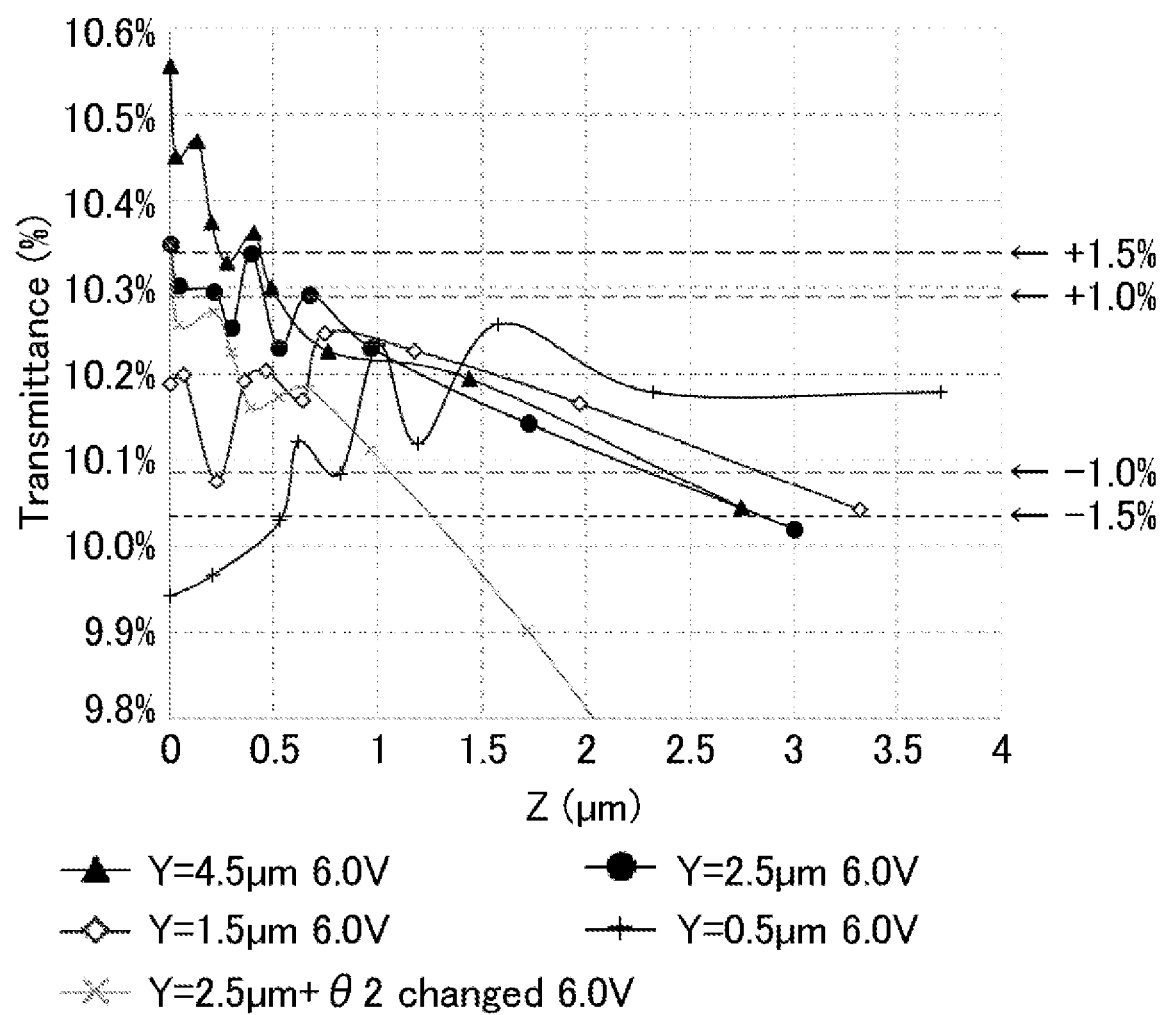
FIG. 50 is a graph showing the relationship between the value Z and the transmittance at an applied voltage of 6.0 V.

The relationship between the value (Z) obtained by subtracting the distance Y from the distance X and the transmittance is shown in FIG. 49 and FIG. 50. FIG. 49 is a graph showing the relationship between the value Z and the transmittance at an applied voltage of 5.0 V. FIG. 50 is a graph showing the relationship between the value Z and the transmittance at an applied voltage of 6.0 V. In FIG. 49, the transmittance (9.28%) of Example 2 (5.0 V) was used as a reference. In FIG. 50, the transmittance (10.19%) of Example 2 (6.0 V) was used as a reference. The transmittance variation in each example was examined within the range of ±1.0% and within the range of ±1.5%. As shown in FIG. 49 and FIG. 50, with a wide distance Y (e.g., Y=4.5 μm,) and with a narrow distance Y (e.g., Y=0.5 μm), the transmittance variation is large with the value Z<0.5. In contrast, the figures demonstrate that the transmittance is stable with 0.5 μm≤Z<2.5 μm. Accordingly, in order to reduce transmittance variation in one display unit and to reduce occurrence of display unevenness in the display screen of the liquid crystal display device, the value Z is preferably 0.5 μm≤Z<2.5 μm.

The distances Y, the angles θ1, the distances X, and the values Z in Examples 1 to 50 are listed in Table 1.

TABLE 1

| | Example 1 | Example 2 | Example 3 | Example 4 | Example 5 | Example 6 | Example 7 | Example 8 |
|---|---|---|---|---|---|---|---|---|
| Y (μm) | 0.5 | 1.5 | 2.5 | 4.5 | 0.5 | 1.5 | 2.5 | 4.5 |
| θ1 (°) | 0 | 0 | 0 | 0 | 2 | 2 | 2 | 2 |
| X (μm) | 0.5 | 1.5 | 2.5 | 4.5 | 0.7 | 1.6 | 2.5 | 4.5 |
| Z (μm) | 0 | 0 | 0 | 0 | 0.2 | 0.1 | 0.0 | 0.0 |

| | Example 9 | Example 10 | Example 11 | Example 12 | Example 13 | Example 14 | Example 15 | Example 16 |
|---|---|---|---|---|---|---|---|---|
| Y (μm) | 0.5 | 1.5 | 2.5 | 4.5 | 0.5 | 1.5 | 2.5 | 4.5 |
| θ1 (°) | 4 | 4 | 4 | 4 | 5 | 5 | 5 | 5 |
| X (μm) | 1.0 | 1.7 | 2.7 | 4.6 | 1.1 | 1.9 | 2.8 | 4.7 |
| Z (μm) | 0.5 | 0.2 | 0.2 | 0.1 | 0.6 | 0.4 | 0.3 | 0.2 |

| | Example 17 | Example 18 | Example 19 | Example 20 | Example 21 | Example 22 | Example 23 | Example 24 |
|---|---|---|---|---|---|---|---|---|
| Y (μm) | 0.5 | 1.5 | 2.5 | 4.5 | 0.5 | 1.5 | 2.5 | 4.5 |
| θ1 (°) | 6 | 6 | 6 | 6 | 7 | 7 | 7 | 7 |
| X (μm) | 1.3 | 2.0 | 2.9 | 4.8 | 1.5 | 2.1 | 3.0 | 4.9 |
| Z (μm) | 0.8 | 0.5 | 0.4 | 0.3 | 1.0 | 0.6 | 0.5 | 0.4 |

| | Example 25 | Example 26 | Example 27 | Example 28 | Example 29 | Example 30 | Example 31 | Example 32 |
|---|---|---|---|---|---|---|---|---|
| Y (μm) | 0.5 | 1.5 | 2.5 | 4.5 | 0.5 | 1.5 | 2.5 | 4.5 |
| θ1 (°) | 8 | 8 | 8 | 8 | 10 | 10 | 10 | 10 |
| X (μm) | 1.7 | 2.2 | 3.2 | 5.0 | 2.1 | 2.7 | 3.5 | 5.3 |
| Z (μm) | 1.2 | 0.7 | 0.7 | 0.5 | 1.6 | 1.2 | 1.0 | 0.8 |

| | Example 33 | Example 34 | Example 35 | Example 36 | Example 37 | Example 38 | Example 39 | Example 40 |
|---|---|---|---|---|---|---|---|---|
| Y (μm) | 0.5 | 1.5 | 2.5 | 4.5 | 0.5 | 1.5 | 2.5 | 4.5 |
| θ1 (°) | 14 | 14 | 14 | 14 | 20 | 20 | 20 | 20 |
| X (μm) | 2.8 | 3.5 | 4.2 | 5.9 | 4.2 | 4.8 | 5.5 | 7.2 |
| Z (μm) | 2.3 | 2.0 | 1.7 | 1.4 | 3.7 | 3.3 | 3.0 | 2.7 |

| | Example 41 | Example 42 | Example 43 | Example 44 | Example 45 | Example 46 | Example 47 | Example 48 |
|---|---|---|---|---|---|---|---|---|
| Y (μm) | 2.5 | 2.5 | 2.5 | 2.5 | 2.5 | 2.5 | 2.5 | 2.5 |
| θ1 (°) | 0 | 2 | 4 | 5 | 6 | 7 | 8 | 10 |
| X (μm) | 2.5 | 2.5 | 2.7 | 2.8 | 2.9 | 3.0 | 3.2 | 3.5 |
| Z (μm) | 0 | 0.0 | 0.2 | 0.3 | 0.4 | 0.5 | 0.7 | 1.0 |

TABLE 1-continued

|  | Example 49 | Example 50 |
|---|---|---|
| Y (μm) | 2.5 | 2.5 |
| θ1 (°) | 14 | 20 |
| X (μm) | 4.2 | 5.5 |
| Z (μm) | 1.7 | 3.0 |

[Additional Remarks]

One aspect of the present invention may be a liquid crystal display device including, in the given order: a first substrate; a liquid crystal layer containing liquid crystal molecules; and a second substrate, the first substrate including a first electrode, a second electrode closer to the liquid crystal layer than the first electrode is, and an insulating film between the first electrode and the second electrode, the second electrode being provided with openings including a first opening and a second opening adjacent to each other, the first opening and the second opening being independent of each other and point-symmetrical to each other, the first opening and the second opening each having a shape including: curved portions that expand an opening periphery outward at the respective ends in the longitudinal direction; and paired protruding portions that allow the opening periphery to protrude partially in the lateral direction in the middle of the longitudinal direction, the liquid crystal molecules being aligned parallel to the first substrate in a no-voltage-applied state where no voltage is applied between the first electrode and the second electrode.

The shape of each of the first opening and the second opening each may include a linear portion in the longitudinal direction, and the linear portion of the first opening and the linear portion of the second opening may be parallel to each other.

The shortest distance may be 0.5 μm, or greater and 4.5 μm, or smaller between the straight line that passes a vertex A and is perpendicular to the bisector in the lateral direction of the first opening and the straight line that passes a vertex B and is perpendicular to the bisector in the lateral direction of the second opening, where the vertex A represents the vertex of the curved portion closer to the second opening between the curved portions of the first opening, and the vertex B represents the vertex of the curved portion closer to the first opening between the curved portions of the second opening.

The distance X may be 1 μm<X≤5 μm between the vertex A of the curved portion closer to the second opening between the curved portions of the first opening and the vertex B of the curved portion closer to the first opening between the curved portions of the second opening.

The value Z represented by the following formula (1) may be 0.5 μm≤Z<2.5 μm, $$Z = X - Y \quad (1)$$

wherein X is the distance between the vertex A of the curved portion closer to the second opening between the curved portions of the first opening and the vertex B of the curved portion closer to the first opening between the curved portions of the second opening, and Y is the shortest distance between the straight line that passes the vertex A and is perpendicular to the bisector in the lateral direction of the first opening and the straight line that passes the vertex B and is perpendicular to the bisector in the lateral direction of the second opening.

The first electrode may be provided for each pixel, and the alignment azimuth of the liquid crystal molecules and the extending direction of the long sides of the first electrode may be parallel to each other in the no-voltage-applied state where no voltage is applied between the first electrode and the second electrode.

The first electrode may be provided for each pixel, and the long sides of the first electrode and at least one of the bisector in the lateral direction of the first opening and the bisector in the lateral direction of the second opening may form an angle of 18° or smaller.

The liquid crystal molecules may have positive anisotropy of dielectric constant.

The liquid crystal molecules may be divided into four alignment regions in positions rotationally symmetrical to each other for each of the first opening and the second opening in a voltage-applied state where a voltage is applied between the first electrode and the second electrode.

Each of the aforementioned features of the present invention may be combined as appropriate within the spirt of the present invention.

REFERENCE SIGNS LIST

10: First substrate
11: Insulating substrate
12: Pixel electrode (first electrode)
13: Insulating layer (insulating film)
14: Common electrode (second electrode)
15: First opening
16: Second opening
15a: Protruding portion of first opening
16a: Protruding portion of second opening
15b: Reference line of first opening
16b: Reference line of second opening
15c: Bisector in lateral direction of first opening
16c: Bisector in lateral direction of second opening
20: Liquid crystal layer
21: Liquid crystal molecules
30: Second substrate
31: Insulating substrate
32: Color filter
33: Overcoat layer
41: Source signal line
42: Gate signal line
43: TFT
100: Liquid crystal display device

The invention claimed is:

1. A liquid crystal display device comprising, in order:
a first substrate;
a liquid crystal layer containing liquid crystal molecules; and
a second substrate, wherein:
the first substrate includes a first electrode, a second electrode closer to the liquid crystal layer than the first electrode is, and an insulating film between the first electrode and the second electrode;
the first electrode is provided for each pixel;

the second electrode is provided with openings including a first opening and a second opening adjacent to each other;

the first opening and the second opening are independent of each other and point-symmetrical to each other, and surrounded by the second electrode;

the first opening and the second opening each have a shape including curved portions that expand an opening periphery outward at respective ends of each of the first and second openings in a longitudinal direction of the openings, and paired protruding portions that allow the opening periphery to protrude partially in a lateral direction of the openings in a middle of the longitudinal direction:

the first opening and the second opening are arranged in line in a longitudinal direction of the first electrode:

lengths of the first opening and the second opening along the longitudinal direction of the first electrode are longer than widths of the first opening and the second opening along a lateral direction of the first electrode;

the liquid crystal molecules are aligned parallel to the first substrate in a no-voltage-applied state where no voltage is applied between the first electrode and the second electrode; and a distance X is 1 μm <X ≤5 μm between a vertex A of a curved portion closer to the second opening between the curved portions of the first opening and a vertex B of a curved portion closer to the first opening between the curved portions of the second opening.

2. The liquid crystal display device according to claim 1, wherein the shape of each of the first opening and the second opening includes a linear portion in the longitudinal direction, and the linear portion of the first opening and the linear portion of the second opening are parallel to each other.

3. The liquid crystal display device according to claim 1, wherein a shortest distance is 0.5 μm or greater and 4.5 μm or smaller between a straight line that passes a vertex A in the lateral direction and is perpendicular to a line bisecting a short side of the first opening and a straight line that passes a vertex B in the lateral direction and is perpendicular to a line bisecting a short side of the second opening, and the vertex A represents a vertex of a curved portion closer to the second opening between the curved portions of the first opening, and the vertex B represents a vertex of a curved portion closer to the first opening between the curved portions of the second opening.

4. The liquid crystal display device according to claim 1, wherein:

a value Z represented by the following formula (1) is 0.5 μm≤Z <2.5 μm, Z=X−Y (1);

X is a distance between a vertex A of a curved portion closer to the second opening between the curved portions of the first opening and a vertex B of a curved portion closer to the first opening between the curved portions of the second opening; and Y is a shortest distance between a straight line that passes the vertex A in the lateral direction and is perpendicular to a line bisecting a short side of the first opening and a straight line that passes the vertex B in the lateral direction and is perpendicular to a line bisecting a short side of the second opening.

5. The liquid crystal display device according to claim 1, wherein an alignment azimuth of the liquid crystal molecules and an extending direction of long sides of the first electrode are parallel to each other in the no-voltage-applied state where no voltage is applied between the first electrode and the second electrode.

6. The liquid crystal display device according to claim 1, wherein long sides of the first electrode and at least one of a line bisecting a short side of the first opening and a line bisecting a short side of the second opening form an angle θ1 of 18° or smaller.

7. The liquid crystal display device according to claim 6, wherein an alignment azimuth of the liquid crystal molecules in the no-voltage-applied state and at least one of the line bisecting the short side of the first opening and the line bisecting the short side of the second opening form an angle θ2 of 1.2° or smaller.

8. The liquid crystal display device according to claim 1, wherein the liquid crystal molecules have positive anisotropy of dielectric constant.

9. The liquid crystal display device according to claim 1, wherein the liquid crystal molecules are divided into four alignment regions in positions rotationally symmetrical to each other for each of the first opening and the second opening in a voltage-applied state where a voltage is applied between the first electrode and the second electrode.

10. The liquid crystal display device according to claim 1, wherein the first opening and the second opening in adjacent pixels in the second electrode are arranged in line in a row direction or a column direction.

11. The liquid crystal display device according to claim 1, wherein an angle θ2 is θ1±1.2° , an angle θ1 is formed by long sides of the first electrode and at least one of a line bisecting a short side of the first opening and a line bisecting a short side of the second opening, the angle θ2 is formed by an alignment azimuth of the liquid crystal molecules in the no-voltage-applied state and at least one of the line bisecting the short side of the first opening and the line bisecting the short side of the second opening.

\* \* \* \* \*